(12) United States Patent
Ito

(10) Patent No.: US 8,243,370 B2
(45) Date of Patent: Aug. 14, 2012

(54) ZOOM LENS AND IMAGE PICKUP APPARATUS

(75) Inventor: Daisuke Ito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 328 days.

(21) Appl. No.: 12/753,417

(22) Filed: Apr. 2, 2010

(65) Prior Publication Data

US 2010/0254023 A1 Oct. 7, 2010

(30) Foreign Application Priority Data

Apr. 2, 2009 (JP) ................. 2009-089941

(51) Int. Cl.
*G02B 15/14* (2006.01)
(52) U.S. Cl. .................. 359/682; 359/676; 359/689
(58) Field of Classification Search .......... 359/680–682, 359/689, 676, 683, 685, 687
See application file for complete search history.

(56) References Cited

U.S. PATENT DOCUMENTS

| | | | |
|---|---|---|---|
| 4,838,666 A | 6/1989 | Shiraishi | |
| 7,019,911 B2 | 3/2006 | Saruwatari | |
| 7,286,298 B2 * | 10/2007 | Yamashita | 359/687 |

FOREIGN PATENT DOCUMENTS

| | | |
|---|---|---|
| JP | 63-135913 A | 6/1988 |
| JP | 07-261083 A | 10/1995 |
| JP | 2004-061675 A | 2/2004 |
| JP | 2004-094283 A | 3/2004 |
| JP | 2005-345891 A | 12/2005 |
| JP | 2006-065034 A | 3/2006 |

* cited by examiner

*Primary Examiner* — Dawayne A Pinkney

(74) *Attorney, Agent, or Firm* — Rossi, Kimms & McDowell LLP

(57) ABSTRACT

The zoom lens which is compact and has high optical performance over the entire zoom range includes in order from an object side to an image side, a first lens unit having a negative refractive power, a second lens unit having a positive refractive power, and a third lens unit having a positive refractive power. Distances between the first to third lens units are varied during zooming. The second lens unit includes a lens element whose image side surface has a concave shape, a most object side positive lens element and a most image side positive lens element. Conditions of $$0.4 < d2a/D2 < 0.7,\ 0.5 < f21/f2 < 1.3$$

and $$3.2 < (\beta 2T \cdot \beta 3W)/(\beta 2W \cdot \beta 3T) < 5.0$$

are satisfied.

17 Claims, 13 Drawing Sheets

ZOOM LENS AND IMAGE PICKUP APPARATUS

BACKGROUND OF THE INVENTION

1. Field of the Invention

The present invention relates to a zoom lens suitable for an image pickup apparatus such as a video camera, a still film/digital camera and a TV camera.

2. Related Background Art

Image pickup apparatuses such as video cameras and digital still cameras require, as an image taking optical system, a zoom lens having a wide angle of view, a large aperture ratio and high optical performance. Further, the image pickup apparatuses require a relatively long back focus since various optical members such as a low-pass filter and a color correction filter are disposed between a rearmost lens and an image plane. In addition, the image pickup apparatuses require a good image side telecentric characteristic to avoid color shading.

A negative lead type zoom lens in which a lens unit having a negative refractive power is disposed closest to an object is known as a small zoom lens having a long back focus and a good image side telecentric characteristic.

Japanese Patent Laid-Open Nos. 2004-061675 and 2004-094283 disclose zoom lenses each being constituted by three lens units including a first lens unit having a negative refractive power, a second lens unit having a positive refractive power and a third lens unit having a positive refractive power in order from an object side to an image side (image plane side). U.S. Pat. No. 7,019,911 and Japanese Patent Laid-Open No. 2006-65034 disclose zoom lenses with a three lens unit configuration and a high zoom ratio in which all lens units are moved for zooming. U.S. Pat. No. 4,838,666 and Japanese Patent Laid-Open No. 07-261083 disclose zoom lenses with a three lens unit configuration, a wide angle of view, a long back focus and a good image side telecentric characteristic.

Moreover, it is known that correcting distortion of a zoom lens by electrical image processing decreases the distortion which is increased by widening its angle of view.

Furthermore, in order to miniaturize a camera and obtain a high zoom ratio, a retractable zoom lens is known whose length in an optical axis direction is reduced by shortening distances between lens units in a non-used state as compared with those in a used state. In such a retractable zoom lens, a lot of number of the lens units constituting the zoom lens makes the length thereof long, which makes it impossible to reduce the length of the retracted zoom lens.

It is important for achieving miniaturization of the entire zoom lens, reduction of the length of the retracted zoom lens, a high zoom ratio and high optical performance to appropriately set a configuration of each lens unit and an image-forming magnification of the zoom lens.

SUMMARY OF THE INVENTION

The present invention provides a small zoom lens capable of achieving a high zoom ratio and high optical performance over the entire zoom range.

The present invention provides as an aspect thereof a zoom lens including in order from an object side to an image side, a first lens unit having a negative refractive power, a second lens unit having a positive refractive power, and a third lens unit having a positive refractive power. Distances between the first to third lens units in a direction of an optical axis are varied during zooming.

The second lens unit includes a lens element whose image side surface has a concave shape, a most object side positive lens element and a most image side positive lens element. The following conditions are satisfied:

$$0.4 < d2a/D2 < 0.7$$

$$0.5 < f21/f2 < 1.3$$

$$3.2 < (\beta 2T \cdot \beta 3W)/(\beta 2W \cdot \beta 3T) < 5.0$$

where D2 represents a thickness of the second lens unit on the optical axis, d2a represents a distance on the optical axis from a surface Rc whose curvature is strongest among those of image side surfaces having concave shapes in the second lens units to an image side surface of the most image side positive lens element in the second lens unit, f2 represents a focal length of the second lens unit, f21 represents a focal length of the most object side positive lens element in the second lens unit, $\beta 2T$ and $\beta 3T$ respectively represent image-forming magnifications of the second and third lens units at a telephoto end, and $\beta 2W$ and $\beta 3W$ respectively represent image-forming magnifications of the second and third lens units at a wide-angle end.

The present invention provides as another aspect thereof an image pickup apparatus including the above-described zoom lens, and an image pickup element configured to photoelectrically convert an optical image formed by the zoom lens.

Other aspects of the present invention will become apparent from the following description and the attached drawings.

DETAILED DESCRIPTION OF THE PREFERRED EMBODIMENTS

Exemplary embodiments of the present invention will hereinafter be described with reference to the accompanying drawings.

A zoom lens of each of the below-described embodiments of the present invention includes, in order from an object side to an image side (also referred to as "image plane side"), a first lens unit having a negative refractive power, a second lens unit having a positive refractive power, and a third lens unit having a positive refractive power. In the zoom lens, distances between the first to third lens units in a direction of an optical axis (hereinafter referred to as "optical axis direction") are varied during zooming. Specifically, during zooming from a wide-angle end to a telephoto end, the first lens unit is moved along a locus convex toward the image side, the second lens unit is moved monotonically to the object side, and the third lens unit is moved monotonically to the image side.

Figure 1:
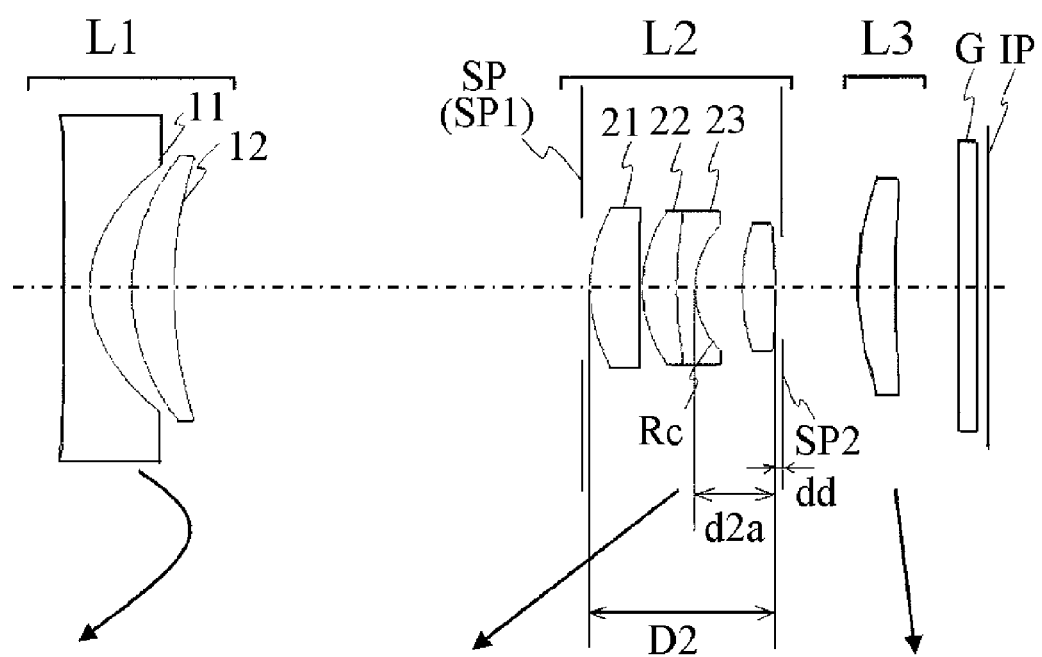
FIG. 1 is a cross-sectional view of a zoom lens that is Embodiment 1 (Numerical Example 1) of the present invention.
Figure 2:
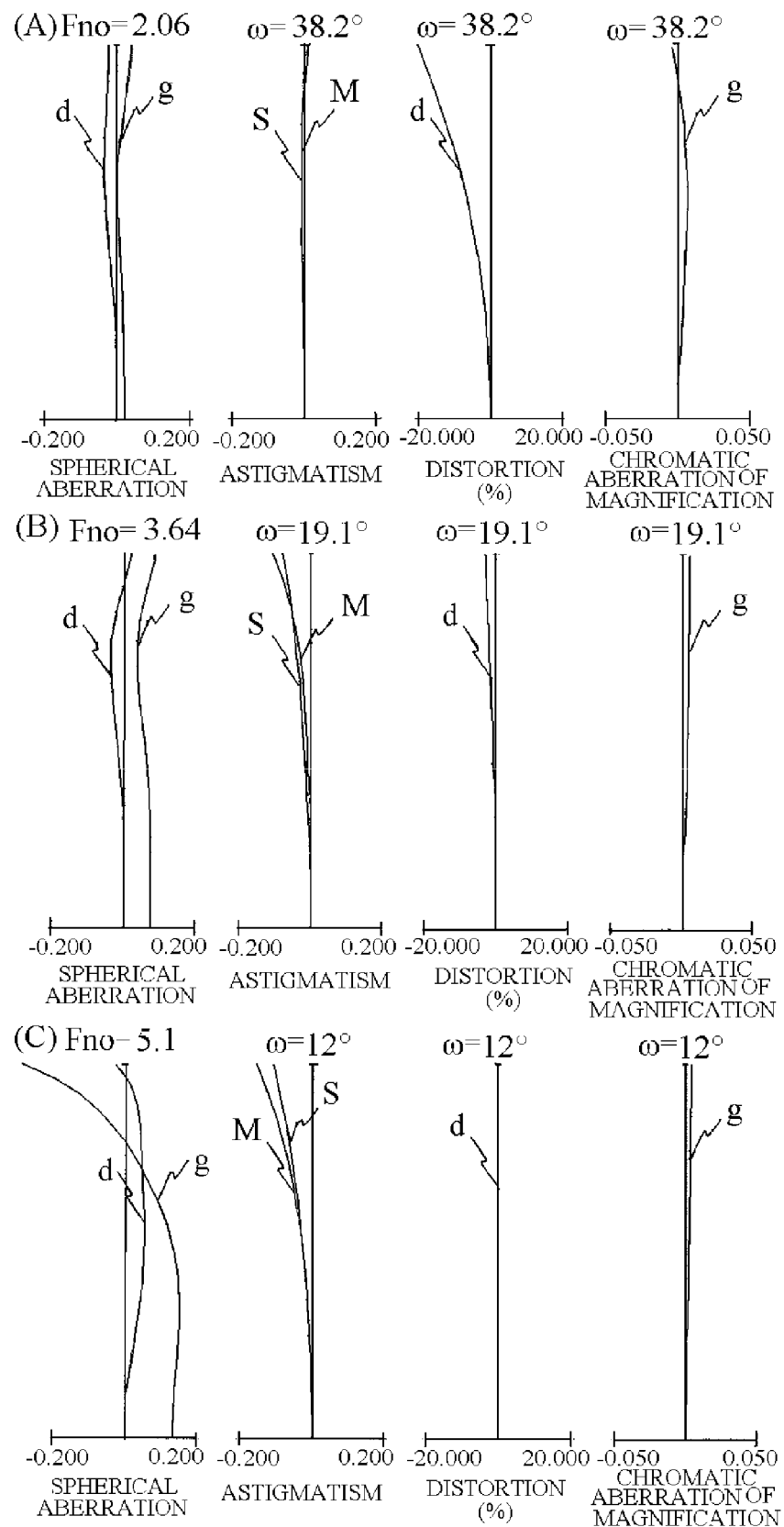
FIG. 2 shows aberration charts of the zoom lens of Embodiment 1 at a wide-angle end, a middle zoom position and a telephoto end.
Figure 3:
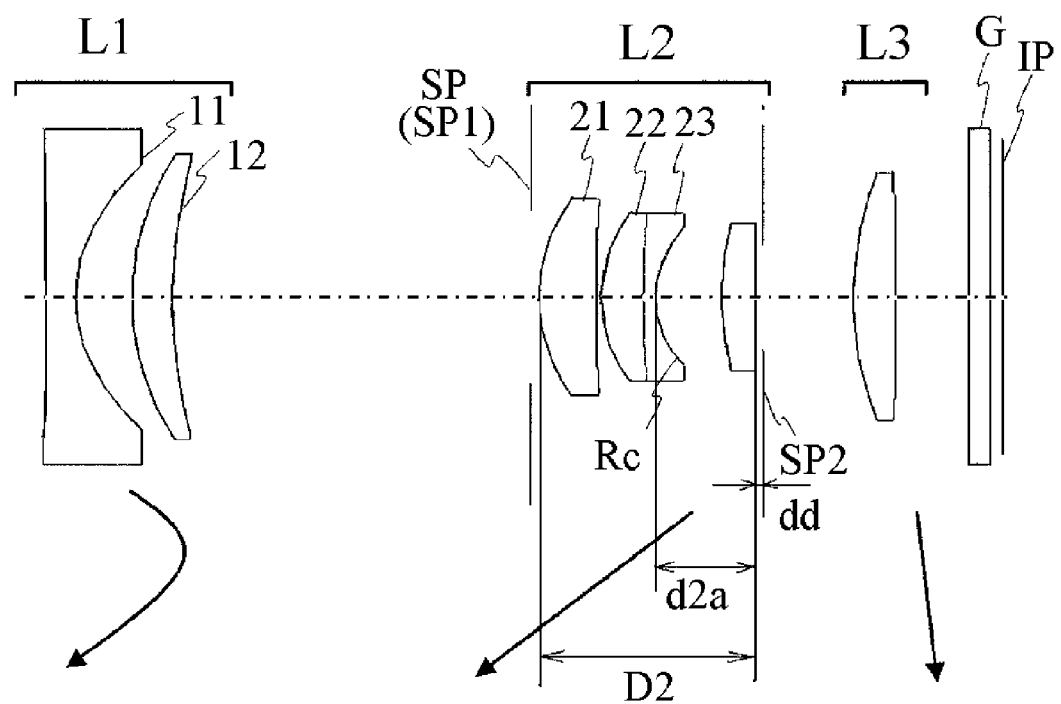
FIG. 3 is a cross-sectional view of a zoom lens that is Embodiment 2 (Numerical Example 2) of the present invention.
Figure 4:
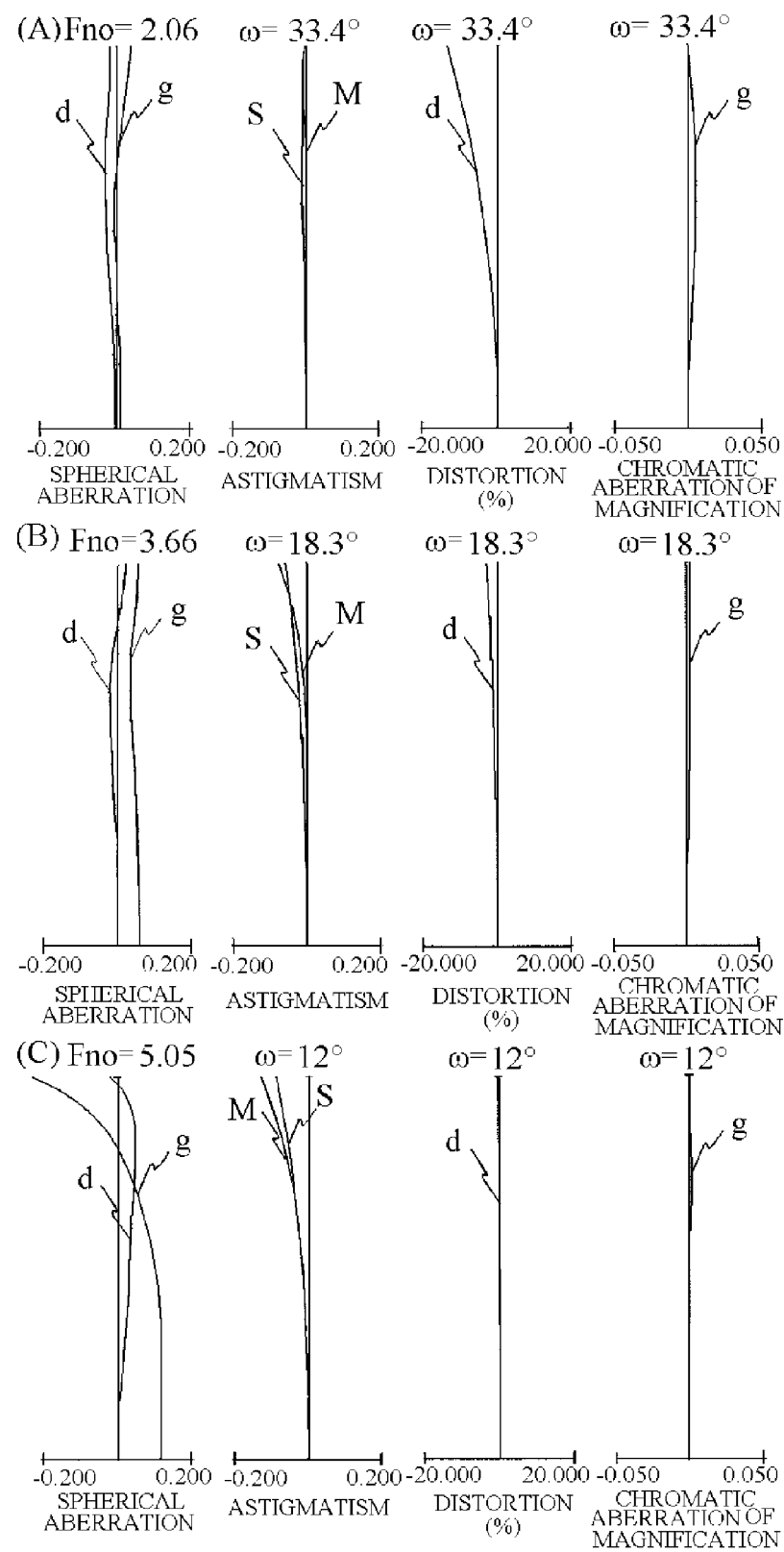
FIG. 4 shows aberration charts of the zoom lens of Embodiment 2 at a wide-angle end, a middle zoom position and a telephoto end.

FIG. 1 is a cross-sectional view of the zoom lens of a first embodiment (Embodiment 1) at the wide-angle end (short focal length end). FIG. 2 shows aberration charts of the zoom lens of Embodiment 1 at the wide-angle end (A), at a middle zoom position (B) and at the telephoto end (long focal length end) (C). The zoom lens of Embodiment 1 has a zoom ratio (magnification variation ratio) of 4.4 and an aperture ratio of about 2.1-5.1. FIG. 3 is a cross-sectional view of the zoom lens of a second embodiment (Embodiment 2) at the wide-angle end. FIG. 4 shows aberration charts of the zoom lens of Embodiment 2 at the wide-angle end (A), at a middle zoom position (B) and at the telephoto end. The zoom lens of Embodiment 2 has a zoom ratio of 3.5 and an aperture ratio of about 2.1-5.1.

Figure 5:
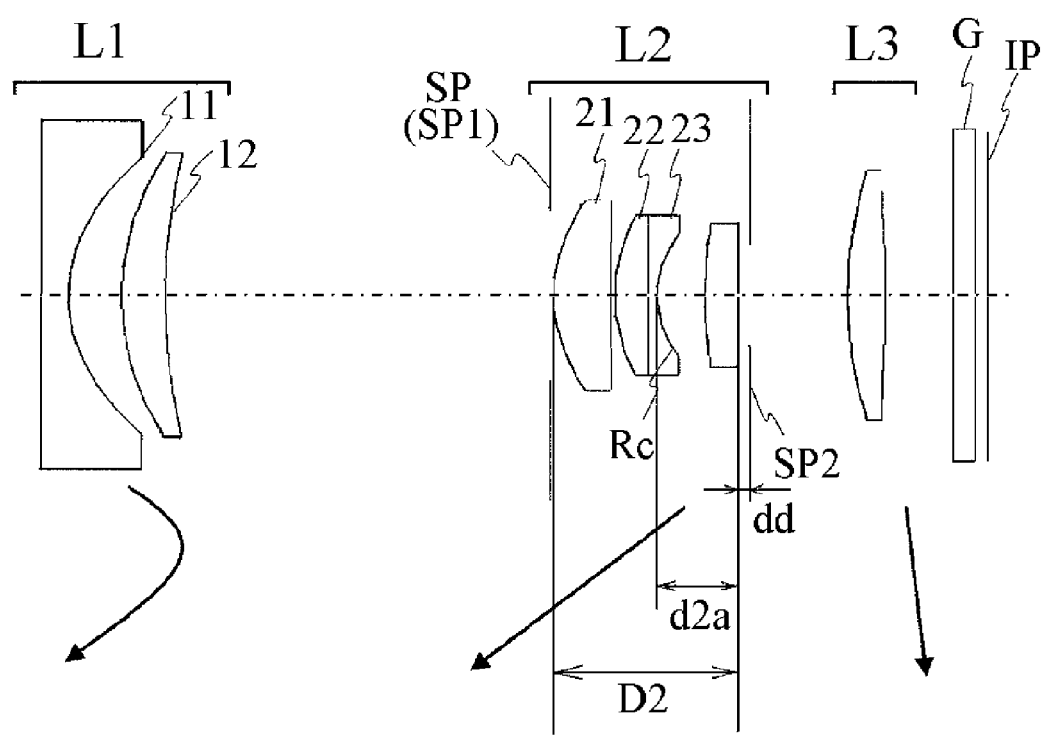
FIG. 5 is a cross-sectional view of a zoom lens that is Embodiment 3 (Numerical Example 3) of the present invention.
Figure 6:
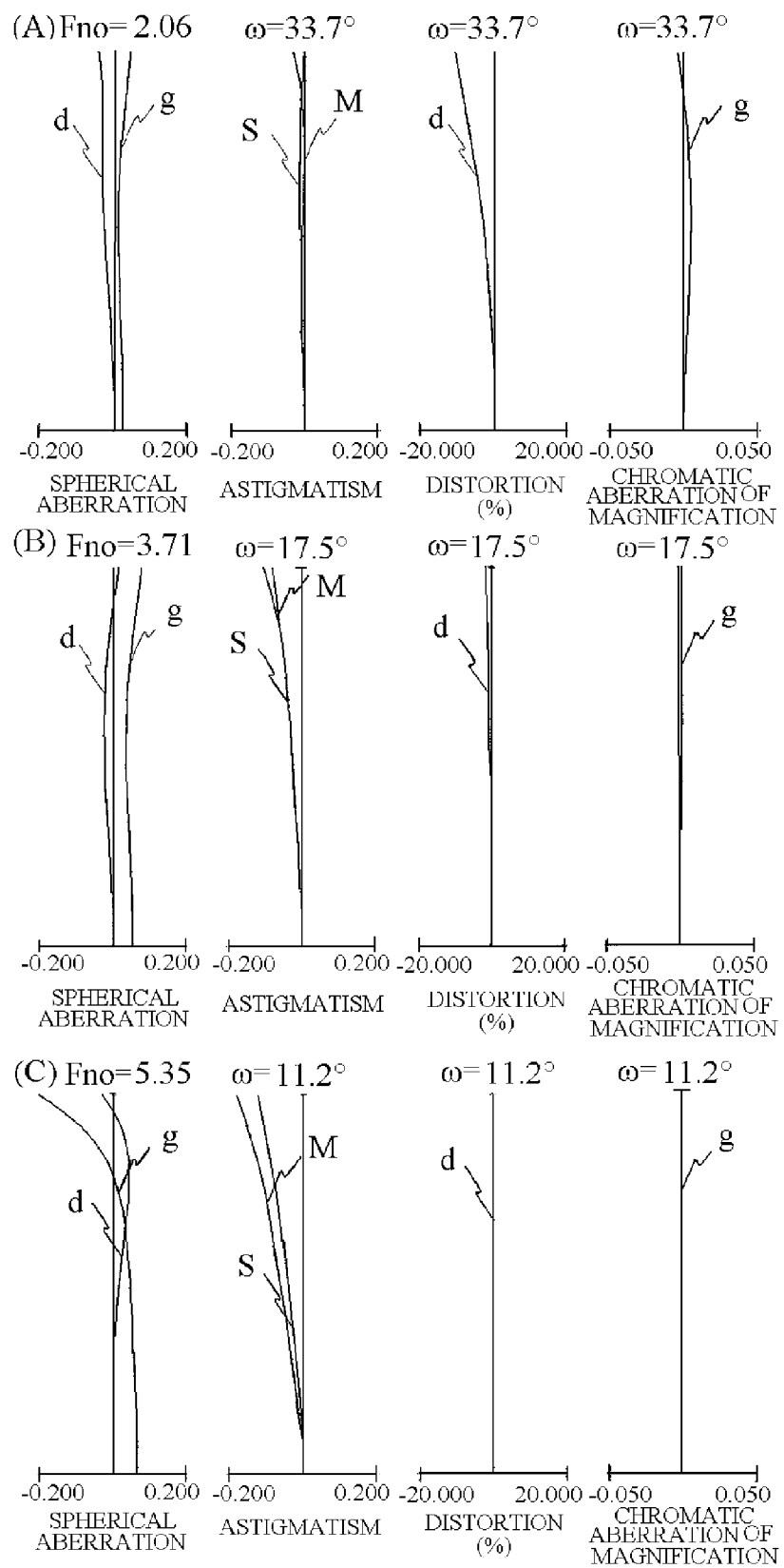
FIG. 6 shows aberration charts of the zoom lens of Embodiment 3 at a wide-angle end, a middle zoom position and a telephoto end.
Figure 7:
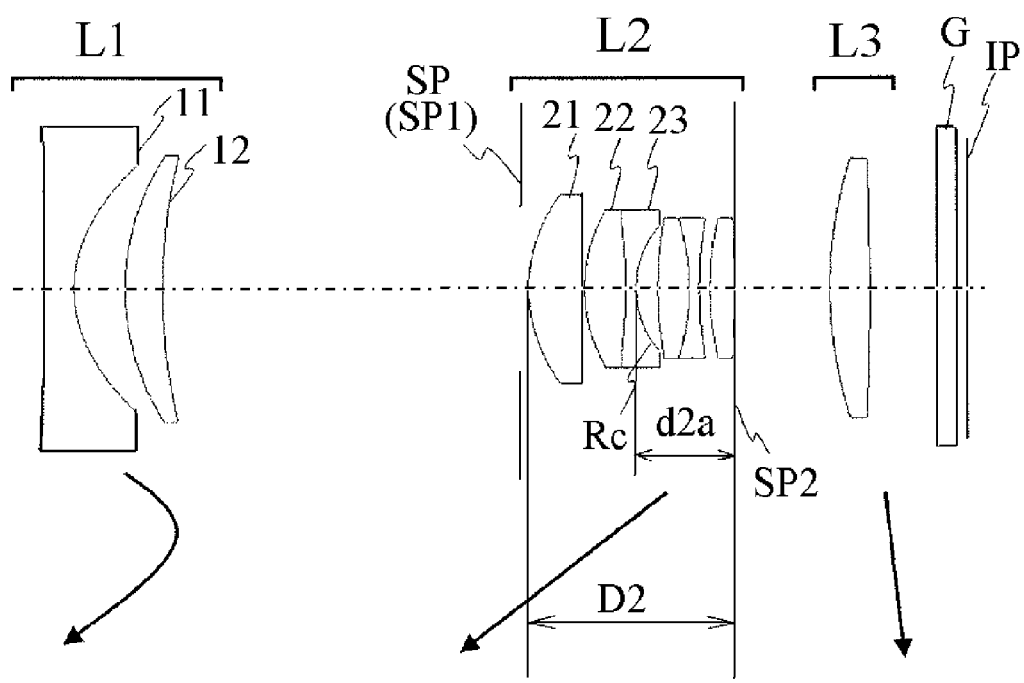
FIG. 7 is a cross-sectional view of a zoom lens that is Embodiment 4 (Numerical Example 4) of the present invention.
Figure 8:
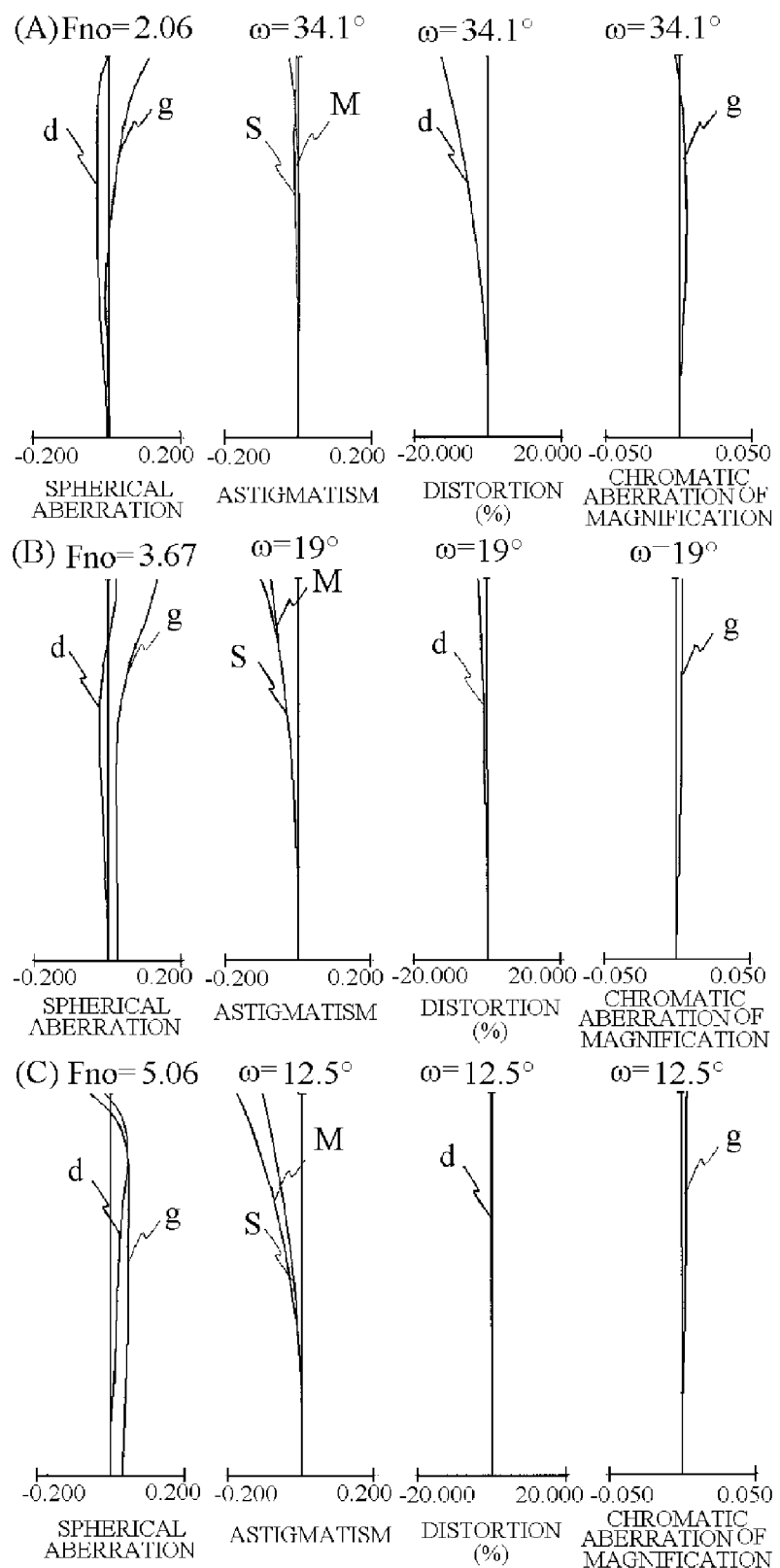
FIG. 8 shows aberration charts of the zoom lens of Embodiment 4 at a wide-angle end, a middle zoom position and a telephoto end.

FIG. 5 is a cross-sectional view of the zoom lens of a third embodiment (Embodiment 3) at the wide-angle end. FIG. 6 shows aberration charts of the zoom lens of Embodiment 3 at the wide-angle end (A), at a middle zoom position (B) and at the telephoto end. The zoom lens of Embodiment 3 has a zoom ratio of 3.8 and an aperture ratio of about 2.6-5.4. FIG. 7 is a cross-sectional view of the zoom lens of a fourth embodiment (Embodiment 4) at the wide-angle end. FIG. 8 shows aberration charts of the zoom lens of Embodiment 4 at the wide-angle end (A), at a middle zoom position (B) and at the telephoto end. The zoom lens of Embodiment has a zoom ratio of 3.4 and an aperture ratio of about 2.1-5.1.

Figure 9:
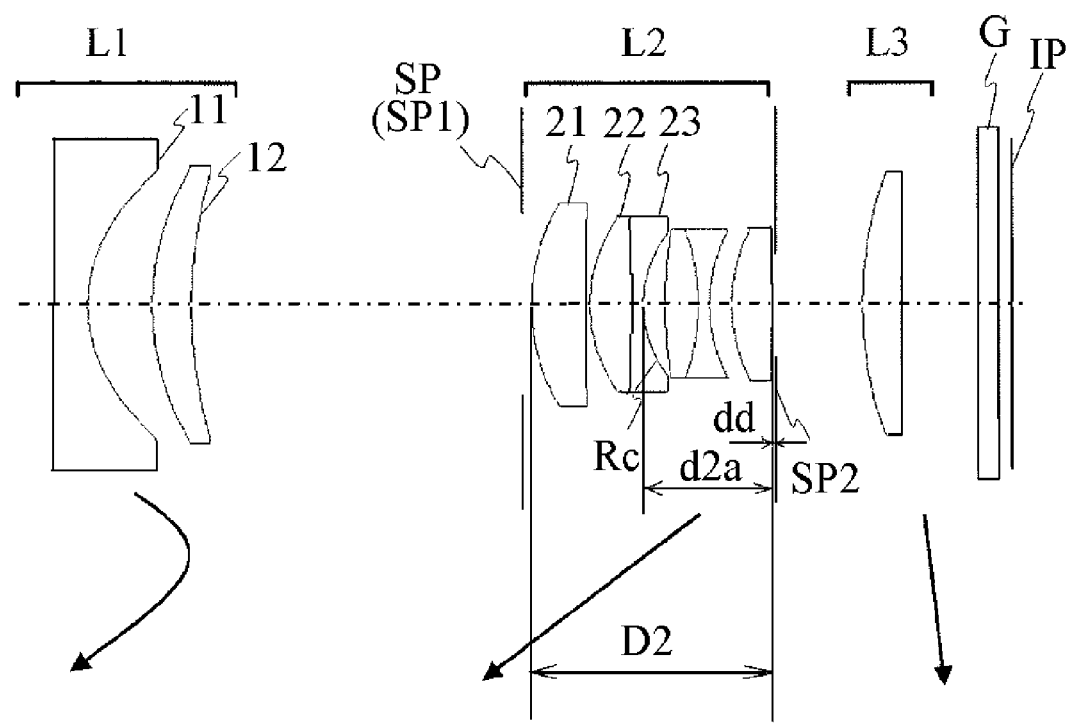
FIG. 9 is a cross-sectional view of a zoom lens that is Embodiment 5 (Numerical Example 5) of the present invention.
Figure 10:
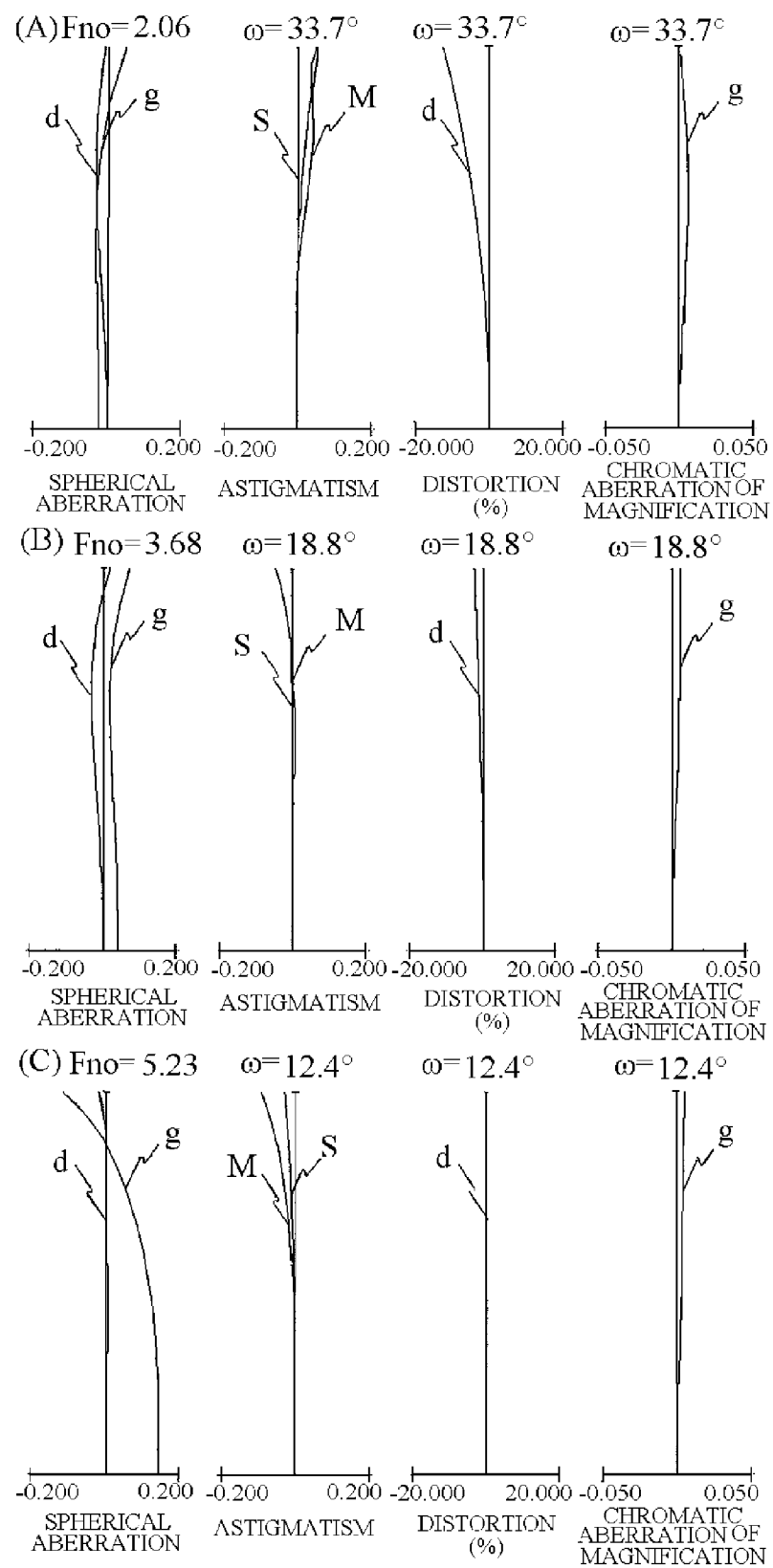
FIG. 10 shows aberration charts of the zoom lens of Embodiment 5 at a wide-angle end, a middle zoom position and a telephoto end.
Figure 11:
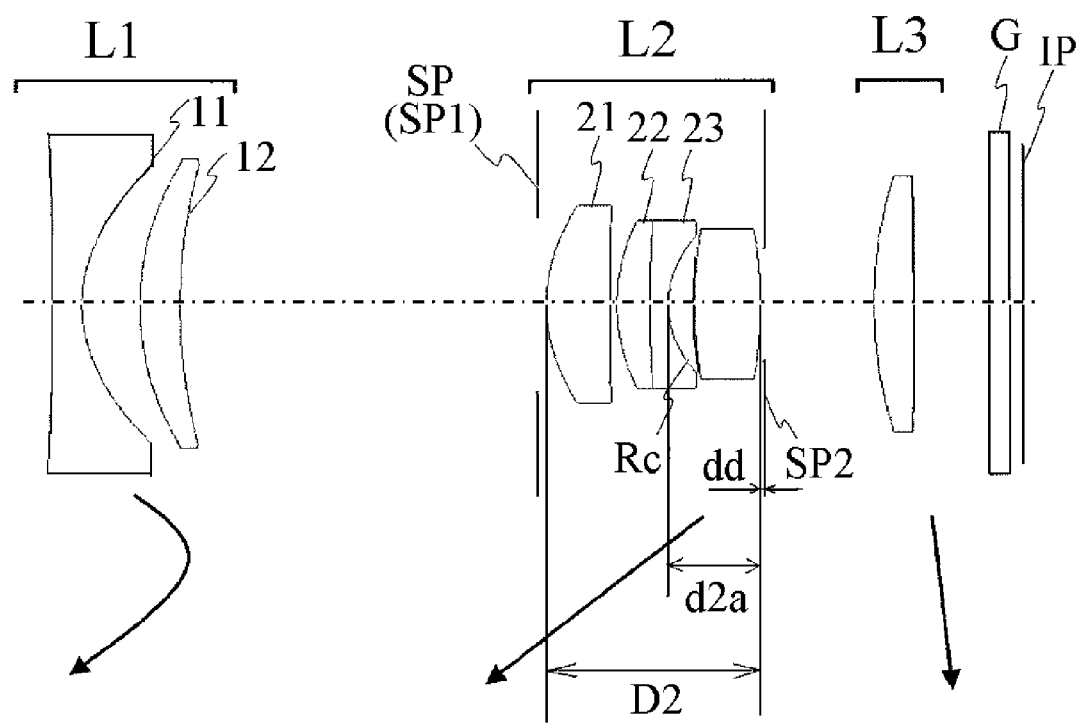
FIG. 11 is a cross-sectional view of a zoom lens that is Embodiment 6 (Numerical Example 6) of the present invention.
Figure 12:
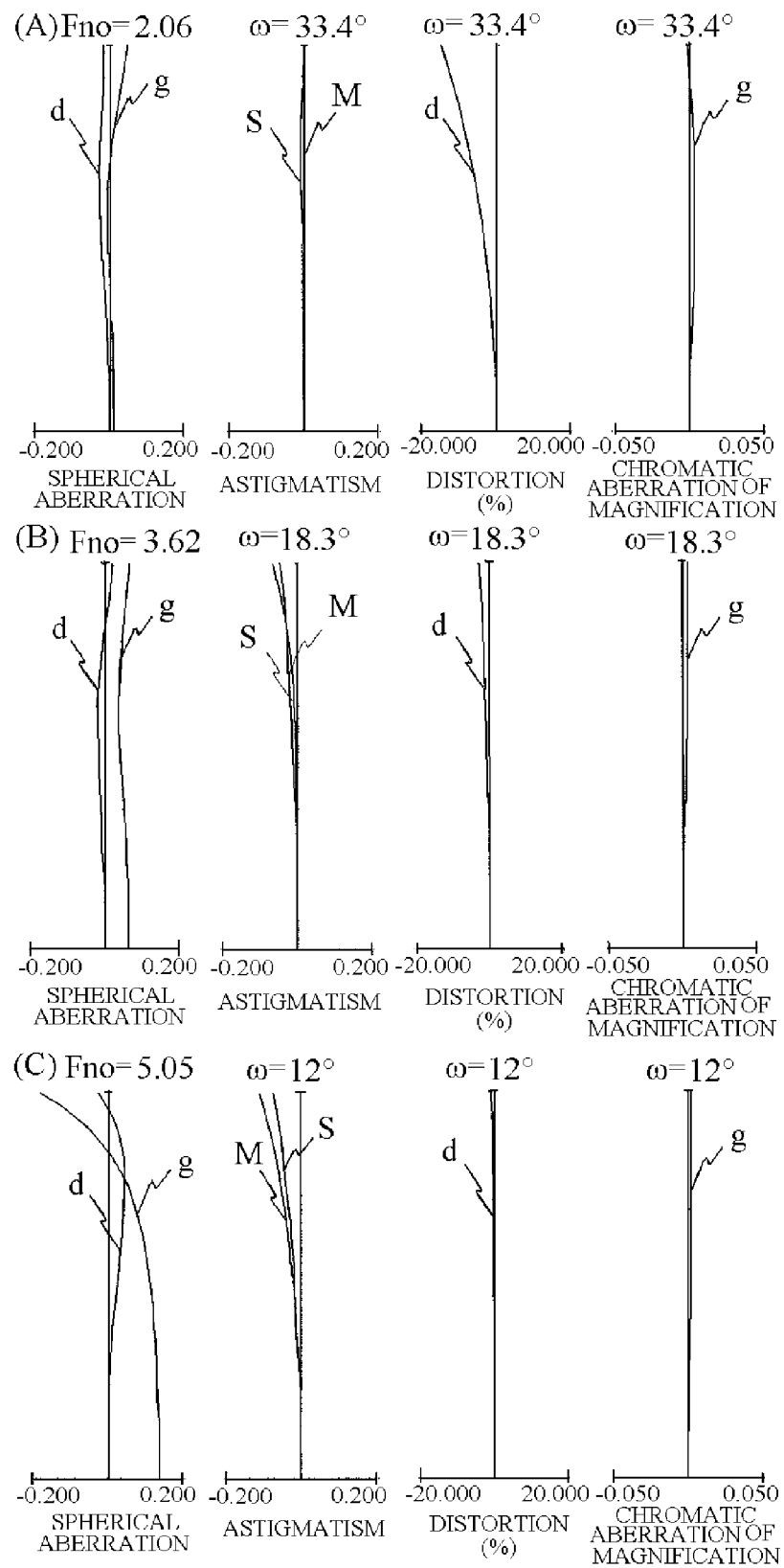
FIG. 12 shows aberration charts of the zoom lens of Embodiment 6 at a wide-angle end, a middle zoom position and a telephoto end.

FIG. 9 is a cross-sectional view of the zoom lens of a fifth embodiment (Embodiment 5) at the wide-angle end. FIG. 10 shows aberration charts of the zoom lens of Embodiment 5 at the wide-angle end (A), at a middle zoom position (B) and at the telephoto end. The zoom lens of Embodiment 5 has a zoom ratio of 3.4 and an aperture ratio of about 2.1-5.2. FIG. 11 is a cross-sectional view of the zoom lens of a sixth embodiment (Embodiment 6) at the wide-angle end. FIG. 12 shows aberration charts of the zoom lens of Embodiment 6 at the wide-angle end (A), at a middle zoom position (B) and at the telephoto end. The zoom lens of Embodiment 6 has a zoom ratio of 3.5 and an aperture ratio of about 2.1-5.1.

Figure 13:
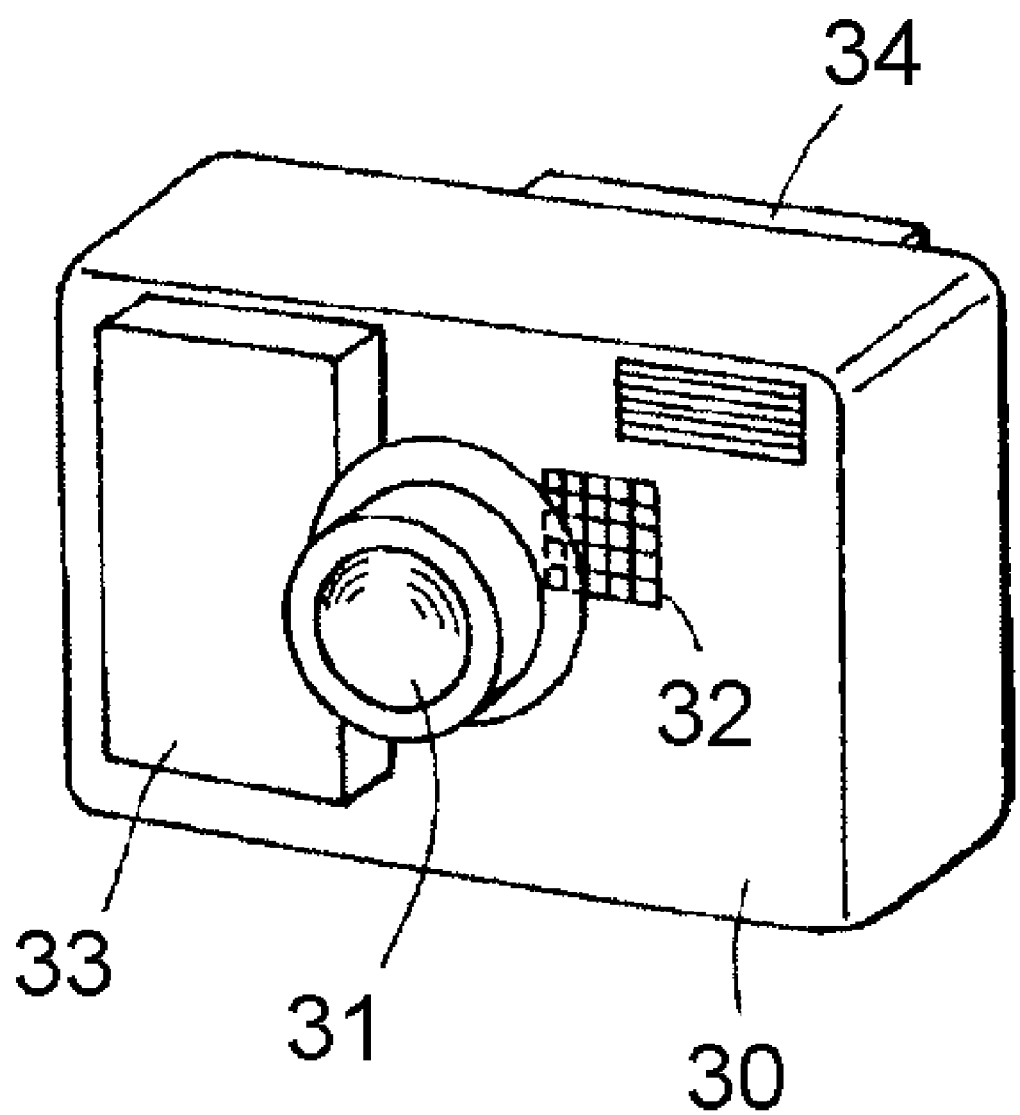
FIG. 13 is a schematic view of an image pickup apparatus provided with the zoom lens of any one of Embodiments 1-6.

FIG. 13 is a schematic view of an image pickup apparatus such as a digital still camera or a video camera equipped with the zoom lens of any one of Embodiments 1-6. The zoom lens is used as an image-taking lens to form an object image on an image pickup plane of a solid-state image pickup element (photoelectric conversion element) such as a CCD sensor or a CMOS sensor.

In each cross-sectional view of the zoom lens, a left side corresponds to the object side (front side), and a right side corresponds to the image side (rear side). Reference character L1 denotes the first lens unit having the negative refractive power ("optical power" means a reciprocal of a focal length), reference character L2 denotes the second lens unit having the positive refractive power, and reference character L3 denotes the third lens unit having the positive refractive power. Reference character SP denotes an aperture stop, which is disposed at an object side position in the second lens unit L2 (in other words, the aperture stop SP is disposed on the object side further than the second lens unit L2 or between the first and second lens units L1 and L2). Reference character SP1 denotes a variable aperture stop, and reference character SP2 denotes a mechanical aperture stop. The aperture stop SP and the variable aperture stop SP1 are arranged at a same position. Reference character G denotes an optical block including optical members such as an optical filter and a face plate. Reference character IP denotes an image plane. Arrows in the figures show movement loci of the respective lens units during zooming from the wide-angle end to the telephoto end.

In each aberration chart, d denotes spherical aberration and distortion for d-line, and g denotes spherical aberration and chromatic aberration of magnification for g-line. M and S respectively denote astigmatic on a meridional image surface and astigmatic on a sagittal image surface. Reference character Fno denotes an F-number, and reference character ω denotes a half angle of view.

In each embodiment, zoom positions of the wide-angle end and the telephoto end mean positions corresponding to mechanical ends of a movable range of a lens unit for variation of magnification on the optical axis.

As described above, the zoom lens of each embodiment includes, in order from the object side to the image side, the first lens unit L1 having the negative refractive power, the second lens unit L2 having the positive refractive power, and the third lens unit L3 having the positive refractive power. In the zoom lens, during the zooming from the wide-angle end to the telephoto end, the first lens unit L1 is moved along the locus convex toward the image side, the second lens unit L2 is moved monotonically to the object side, and the third lens unit L3 is moved monotonically to the image side. The second lens unit L2 is moved to mainly perform variation of magnification, and the first and third lens units are moved to correct variation of the image plane caused due to the variation of magnification.

The third lens unit L3 is also moved to the object side to perform focusing from an infinitely distant object to a near object. Moreover, the third lens unit L3 shares part of a refractive power of the zoom lens increased due to miniaturization of the zoom lens, which reduces a refractive power of a short zoom system constituted by the first and second lens units L1 and L2 to suppress aberration generated in the first lens unit L1, thereby achieving good optical performance. Further, using the third lens unit L3 as a field lens provides a good image side telecentric characteristic of the zoom lens.

In each embodiment, the aperture stop SP determining an F number at the wide-angle end and the variable aperture stop SP1 determining full-open F numbers at the wide-angle end, the middle zoom position and the telephoto end are arranged at the same position.

At an image side position in the second lens unit L2 (in other words, on the image side further than the second lens unit L2 or between the second and third lens units L2 and L3), the mechanical aperture stop SP2 having a fixed aperture diameter is disposed. The mechanical aperture stop SP2 cuts unnecessary light deteriorating the optical performance of the zoom lens. Specifically, since enlargement of an aperture diameter of the zoom lens over the entire zoom range increases comatic flare generated by an upper ray of off-axis light rays, the mechanical aperture stop SP2 cuts the upper line of the off-axis light rays. Setting the aperture diameter of the mechanical aperture stop SP2 so as not to cut axial light rays at the telephoto end reduces the comatic flare generated by the upper ray of the off-axis light rays over the entire zoom range, thereby achieving high optical performance over the entire zoom range.

Moreover, the first and second lens units L1 and L3 arranged on both side of the aperture stop SP1 various aberrations reduce various off-axis aberrations, which achieves good optical performance without increasing the number of lens elements.

Next, description will be made of a lens configuration of each lens unit.

The first lens unit L1 is constituted by, in order from the object side to the image side, a negative lens element 11 whose image side surface has a concave shape and a positive lens element 12 which has a meniscus shape and whose image side surface has a concave shape. The first lens unit L1 causes off-axis principle rays to form an image at a center of the aperture stop SP. The first lens unit L1 greatly refracts the off-axis principle rays especially on a wide-angle side, which easily generates various off-axis aberrations, in particular astigmatism and distortion. Thus, an object side surface of the negative lens element 11 is formed to an aspheric shape which increases its negative refractive power as a position approaches a periphery of the negative lens element 11 from a center thereof, and the image side surface thereof is formed to an aspheric shape which decreases the negative refractive power as a position approaches the periphery thereof from the center thereof. This enables good correction of the astigmatism and reduction of the distortion such that the remaining distortion can be electrically corrected. Further, the above two lens element configuration of the first lens unit L1 enables miniaturization of the entire zoom lens. Moreover, the first lens unit L1 is formed of a high refractive index material, which reduces a diameter thereof. Furthermore, lens surfaces other than the object side surface of the negative lens element 11 constituting part of the first lens unit L1 are formed to shapes close to concentric spheres whose center are located at an intersection point of the variable aperture stop SP1 and the optical axis in order to reduce the off-axis aberrations generated due to refraction of the off-axis principle rays. The object side surface of the negative lens element 11 is formed to a flat shape in a paraxial region in order to correct field curvature while enabling electrical correction of the distortion.

The second lens unit L2 is constituted by, in order from the object side to the image side, a positive lens element 21 whose object side surface has a convex shape, a positive lens element 22 whose object side surface has a convex shape, a negative lens element 23 whose image side surface has a concave shape, and a positive lens element disposed at a most image side position (closest to the image plane) in the second lens unit L2. The positive lens element 21 corresponds to "most object side positive lens element", the positive lens element 22 corresponds to "second object side positive lens element", and the positive lens element disposed at the most image side position corresponds to "most image side positive lens element". The second lens unit L2 as a whole is constituted by four to six lens elements.

Enlarging the aperture diameter of the zoom lens at the wide-angle end widens a diameter of an axial light flux (axial light rays) near the variable aperture stop SP1, which greatly generates spherical aberration and comatic aberration. These aberrations are generated due to refraction of light rays at a lens surface, and are increased as the refraction becomes greater. Therefore, the positive lens element 21 is disposed at a position where a radial height of the axial light ray that has passed through the variable aperture stop SP1 is maximum. The positive lens 21 has the object side surface with a convex shape and an appropriate refractive power, which gently refracts light rays to reduce various aberrations. In addition, the positive lens 21 has aspheric surfaces on both sides, which particularly facilitates correction of spherical aberration. In each embodiment, the object side surface of the positive lens element 21 is formed to an aspheric shape which decreases its positive refractive power as a position approaches a periphery of the positive lens element 21 from a center thereof so as to correct the spherical aberration and comatic aberration.

Moreover, the positive lens element 22 having the object side surface with a convex shape is disposed on the image side further than the positive lens element 21 such that the positive lens elements 21 and 22 share a required refractive power with each other. The spherical aberration and comatic aberration generated due to refractions of light rays at the positive lens elements 21 and 22 are corrected by the image side concave surface of the negative lens element 23 which inversely refracts the light rays.

In order to realize a zoom lens having a large aperture ratio and high optical performance, it is necessary to arrange the positive lens element 21, the positive lens element 22 and the negative lens element 23 to appropriate positions on the optical axis. Specifically, increasing the aperture ratio reduces a depth of focus at the wide-angle end, which makes it important to correct field curvature. In order to correct the field curvature, it is necessary to arrange the positive lens element 21, the positive lens element 22 and the negative lens element 23 to positions away from the image plane.

For example, an increase of the refractive power of the second lens unit L2 is advantageous to achieve miniaturization of the zoom lens and a high zoom ratio, but it makes it difficult to correct the field curvature since it is necessary to arrange the positive lens element 21, the positive lens element 22 and the negative lens element 23 to positions close to the image plane.

Moreover, it is important for increasing the aperture ratio to dispose the final lens (most image side positive lens element) of the second lens unit L2 to a position close to the image plane. An incident angle of axial light rays on the image plane increases as the aperture ratio increases, and therefore, if refraction of the axial light rays is not made by a positive lens element disposed close to the image plane, an effective diameter of the positive lens element 21 at which a height of the axial light ray becomes maximum at the wide-angle end is increased, and correction of the spherical aberration becomes difficult. Accordingly, in addition to the third lens unit L3 which is a positive lens unit disposed close to the image plane, the most image side positive lens element is disposed closest to the image plane in the second lens unit L2 to cause it to share part of the refractive power, which enables reduction of the spherical aberration and reduction of a size of the entire zoom lens.

As described above, in order to correct the field curvature well and reduce the spherical aberration increased due to enlargement of the aperture diameter, the positions of the positive lens element 21, positive lens element 22 and negative lens element 23 are important. Thus, at a position closest to the image plane in the second lens unit L2 and away at a certain distance from an image side concave surface Rc with a strong refractive power which corrects the spherical aberration and comatic aberration generated at the positive lens elements 21 and 22, an image side surface of the most image side positive lens element is disposed.

The image side concave surface Rc has a strongest curvature among those of all image side concave surfaces included in the second lens unit L2. Although it is important to achieve high optical performance and miniaturization of the entire zoom lens, an increase of a distance from the image side concave surface Rc to the final surface (most image side surface) of the second lens unit L2 (that is, the image side surface of the most image side positive lens element) is disadvantageous for miniaturization of the entire zoom lens. Arranging the image side surface of the most image side positive lens element of the second lens unit L2 to a position excessively close to the positive lens element 21, positive lens element 22 and negative lens element 23 for the miniaturization of the entire zoom lens makes it difficult to correct both the field curvature and the spherical aberration.

The third lens unit L3 is constituted by a positive lens element 31 whose object side surface has a convex shape, and has a role as a field lens to provide to the zoom lens an image side telecentric characteristic. When sk' represents a back focus, f3 represents a focal length of the third lens unit L3, and β3 represents an image-forming magnification, the following relationship is established:

$$sk' = f3(1-\beta 3)$$

where $0 < \beta 3 < 1.0$.

Moving the third lens unit L3 for zooming from the wide-angle end to the telephoto end decreases the back focus sk' and increases the image-forming magnification β3 of the third lens unit L3 on a telephoto side. This enables the third lens unit L3 to share part of the variation of magnification, which reduces a movement amount of the second lens unit L2 to facilitate miniaturization of the entire zoom lens.

When taking an image of a near object by using the zoom lens of each embodiment, a movement of the first lens unit L1 to the object side can provide good performance. The third lens unit L3 may be moved to the object side. Moving the third lens unit L3 to perform focusing can decrease an effective diameter of the first lens unit L1 to be smaller than a case of moving the first lens unit L1. Moreover, moving the third lens unit L3 can reduce load of an actuator to be smaller than the case of moving the first lens unit L1 having a large weight. Further, moving the third lens unit L3 enables the first and second lens units L1 and L2 to move in an interlocking manner with a simple mechanism such as a cam, which simplifies a mechanical configuration and improves accuracy thereof.

Furthermore, when performing focusing by moving the third lens unit L3, moving the third lens unit L3 to the image side during zooming from the wide-angle end to the telephoto end enables the third lens unit L3 to be disposed close to the image plane at the telephoto end where a movement amount of the third lens unit L3 for focusing is large.

Thus, the third lens unit L3 is effectively moved during zooming and focusing, which facilitates the miniaturization of the zoom lens.

The zoom lens of each embodiment satisfies the following conditions (1)-(3) where D2 represents a thickness of the second lens unit L2 on the optical axis, d2a represents the distance on the optical axis from the image side concave surface Rc whose curvature is strongest among those of the image side concave surfaces in the second lens unit L2 to the image side surface of the most image side positive lens element in the second lens unit L2, f2 represents a focal length of the second lens unit L2, f21 represents a focal length of the most object side positive lens element in the second lens unit L2, β2T and β3T respectively represent image-forming magnifications of the second and third lens units L2 and L3 at the telephoto end, and β2W and β3W respectively represent image-forming magnifications of the second and third lens units L2 and L3 at the wide-angle end:

$$0.4 < d2a/D2 < 0.7 \tag{1}$$

$$0.5 < f21/f2 < 1.3 \tag{2}$$

$$3.2 < (\beta 2T \cdot \beta 3W)/(\beta 2W \cdot \beta 3T) < 5.0 \tag{3}.$$

If the distance d2a is long such that the value of d2a/D2 becomes larger than the upper limit of the condition (1), the thickness of the second lens unit L2 on the optical axis is increased, which is not desirable. If the distance d2a is short such that the value of d2a/D2 becomes smaller than the lower limit of the condition (1), it becomes difficult to dispose the positive lens element at the most image side position in the second lens unit L2 or the effective diameter of the positive lens element 21 is increased, which makes it difficult to correct the spherical aberration over the entire zoom range.

If the focal length f21 is long such that the value of f21/f2 becomes larger than the upper limit of the condition (2), the refractive power of the positive lens element 21 is decreased, and therefore increasing the aperture diameter ratio excessively increases the refractive index of the most image side positive lens element in the second lens unit L2, which undesirably makes it difficult to correct the spherical aberration and the comatic aberration.

If the focal length f21 is short such that the value of f21/f2 becomes smaller than the lower limit of the condition (2), the refractive power for refracting the axial light rays at the positive lens element 21 is excessively increased, which undesirably makes it difficult to correct the spherical aberration and the comatic aberration. Further, increasing the aperture diameter ratio reduces the depth of focus, and therefore good correction of the field curvature is required. However, if the value of f21/f2 is smaller than the lower limit of the condition (2), large field curvature is generated, which is undesirable.

If the value of $(\beta 2T \cdot \beta 3W)/(\beta 2W \cdot \beta 3T)$ is larger than the upper limit of the condition (3), the share of the second lens unit L2 in the variation of magnification is increased to a level sufficient for achieving a high zoom ratio. However, this makes it necessary to increase the number of lens elements in the second lens unit L2 to cause the lens elements to share aberration correction roles, which is undesirable. If the value of $(\beta 2T \cdot \beta 3W)/(\beta 2W \cdot \beta 3T)$ is smaller than the lower limit of the condition (3), the share of the third lens unit L3 in the variation of magnification is increased, which undesirably increases a movement amount of the third lens unit L3 to enlarge the entire zoom lens.

It is more preferable to set the numerical ranges of the conditions (1)-(3) as follows in each embodiment:

$$0.42 < d2a/D2 < 0.55 \tag{1a}$$

$$0.70 < f21/f2 < 1.05 \tag{2a}$$

$$3.3 < (\beta 2T \cdot \beta 3W)/(\beta 2W \cdot \beta 3T) < 4.5 \tag{3a}.$$

As described above, each embodiment appropriately sets the lens configuration of the first lens unit L1 and the image-forming magnifications of the second and third lens units L2 and L3 at the wide-angle end and the telephoto end, which enables realization of a compact zoom lens with a wide angle of view, in which the various aberrations are corrected well.

It is still more preferable that the zoom lens satisfy at least one of the following conditions (4)-(13):

$$1.0<f2/\sqrt{(fW \cdot fT)}<1.3 \quad (4)$$

$$0.7<|f1/f2|<1.15 \quad (5)$$

$$2.0<f3/f2<3.1 \quad (6)$$

$$-1.1<(R21a-R21b)/(R21a+R21b)<-0.7 \quad (7)$$

$$0.12<(R22a-R23b)/(R22a+R23b)<0.35 \quad (8)$$

$$-0.01<dd/fW<0.12 \quad (9)$$

$$1.00<\beta 3T/\beta 3W<1.05 \quad (10)$$

$$1.88<(Nd1P+Nd1N)/2<2.00 \quad (11)$$

$$35<vd1N<60 \quad (12)$$

$$16<vd1P<20 \quad (13).$$

In the above conditions, fW and fT respectively represent focal lengths of the entire zoom lens at the wide-angle end and the telephoto end, f1 and f3 respectively represent focal lengths of the first lens unit L1 and the third lens unit L3, R21a and R21b respectively represent curvature radii of the object side surface and an image side surface of the most object side positive lens element 21 in the second lens unit L2.

As described above, the second lens unit L2 includes, in order from the object side to the image side, the most object side positive lens element 21 whose object side surface has a convex shape, the second object side positive lens element 22 whose object side surface has a convex shape and the negative lens element 23 whose image side surface has a concave shape. R22a represents a curvature radius of the object side surface of the second object side positive lens element 22, and R23b represents a curvature radius of the image side surface of the negative lens element 23.

Further, as described above, the mechanical aperture stop SP2 having a fixed aperture diameter is disposed on the image side further than the image side surface of the most image side positive lens element in the second lens unit L2. In the above conditions, dd represents a distance on the optical axis from the most image side surface of the second lens unit L2 to the mechanical aperture stop SP2.

Moreover, as described above, the first lens unit L1 includes, in order from the object side to the image side, the negative lens element 11 and the positive lens element 12. In the above conditions, Nd1N and vd1N respectively represent a refractive index and an Abbe constant of a material of the negative lens element 11, and Nd1P and vd1P respectively represent a refractive index and an Abbe constant of a material of the positive lens element 12.

If the refractive power of the second lens unit L2 is excessively small such that the value of $f2/\sqrt{(fW \cdot fT)}$ becomes larger than the upper limit of the condition (4), the movement amount of the second lens unit L2 for securing a required zoom ratio is increased, which undesirably enlarges the entire zoom lens. If the refractive power of the second lens unit L2 is excessively large such that the value of $f2/\sqrt{(fW \cdot fT)}$ becomes smaller than the lower limit of the condition (4), the number of the lens elements of the second lens unit L2 for correcting astigmatism and comatic aberration is increased, which undesirably enlarges the second lens unit L2 and makes it difficult to correct the field curvature.

If the focal length of the first lens unit L1 is long such that the value of |f1/f2| becomes larger than the upper limit of the condition (5), the distance between the first and second lens units L1 and L2 is decreased, which makes it difficult to dispose the aperture stop SP between the first and second lens units L1 and L2 at the telephoto end. Moreover, in order to secure an appropriate zoom ratio, the first lens unit L1 is moved further to the object side during zooming, which undesirably enlarges the negative lens element 11 of the first lens unit L1. On the other hand, if the focal length of the first lens unit L1 is short such that the value of |f1/f2| becomes smaller than the lower limit of the condition (5), the refractive power of the first lens unit L1 is excessively increased, which undesirably makes it difficult to correct the comatic aberration though it is advantageous for miniaturizing of the negative lens element 11 of the first lens unit L1 and increasing the angle of view.

If the refractive power of the second lens unit L2 is excessively small such that the value of f3/f2 becomes smaller than the lower limit of the condition (6), the movement amount of the second lens unit L2 to secure a required magnification is increased, which undesirably enlarges the entire zoom lens. If the refractive power of the third lens unit L3 is excessively large such that the value of f3/f2 becomes smaller than the lower limit of the condition (6), the number of lens elements of the third lens unit L3 for correcting the astigmatism is increased, which undesirably enlarges the third lens unit L3. On the other hand, if the refractive power of the second lens unit L2 is excessively large such that the value of f3/f2 becomes larger than the upper limit of the condition (6), the number of the lens elements of the second lens unit L2 for correcting the astigmatism and the comatic aberration is increased, which undesirably enlarges the second lens unit L2 and makes it difficult to correct the field curvature.

If the value of (R21a−R21b)/(R21a+R21b) is larger than the upper limit of the condition (7), the refractive power of the positive lens element 21 is increased, which increases the refractive power of the most image side positive lens element in the second lens unit L2 to compensate the decreased refractive power of the positive lens element 21. This undesirably makes it difficult to correct spherical aberration. If the value of (R21a−R21b)/(R21a+R21b) is smaller than the lower limit of the condition (7), the refractive power of the positive lens element 21 is increased, which undesirably makes it difficult to correct the spherical aberration and the comatic aberration though an incident angle of the axial light rays on the positive lens element 21 is reduced.

If the value of (R22a−R23b)/(R22a+R23b) is larger than the upper limit of the condition (8), excessive correction of the spherical aberration and comatic aberration generated at the positive lens element 21 is caused, which is undesirable. If the value of (R22a−R23b)/(R22a+R23b) is smaller than the lower limit of the condition (8), insufficient correction of the spherical aberration and comatic aberration generated at the positive lens element 21 is caused, which is also undesirable.

If the distance dd is long such that the value of dd/fW becomes larger than the upper limit of the condition (9), the second lens unit L2 and the mechanical aperture stop SP2 are excessively away from each other in the optical axis direction, which makes it impossible to cut the off-axis light rays at both the wide-angle end and telephoto end. Further, shortage of a peripheral light amount at the wide-angle end is caused, which is undesirable.

If the distance dd is short such that the value of dd/fW becomes smaller than the lower limit of the condition (9), interference between the image side surface of the second lens unit L2 and the mechanical aperture stop SP2 is caused, which makes it difficult to dispose the mechanical aperture stop SP2. Further, it becomes impossible to cut the off-axis light rays at the wide-angle end, which makes it difficult to obtain high optical performance.

The condition (10) relates to the image-forming magnifications β3W and β3T of the third lens unit L3 at the wide-angle end and at the telephoto end. If the value of β3T/β3W exceeds the range of the condition (10), a distance between the third lens unit L3 and the above-described optical member disposed on the image side becomes small, which undesirably makes it difficult to correct defocusing generated due to lens assembly errors or causes interference of the third lens unit L3 with the optical member. Further, if the value of β3T/β3W exceeds the range of the condition (10), the magnification variation share of the third lens unit L3 in zooming from the wide-angle end to the telephoto end becomes small, which makes it necessary that the magnification variation ratio be mainly shared by the second lens unit L2. This increases the refractive power of the second lens unit L2 or the movement amount thereof during zooming, which undesirably makes it difficult to achieve good optical performance and lens length reduction.

If the value of (Nd1P+Nd1N)/2 exceeds the range of the condition (11), the refractive index of the material of the negative lens element 11 is reduced and thereby a lens surface curvature of the negative lens element 11 is increased. Moreover, an uneven thickness ratio (ratio of a center thickness and a peripheral thickness) of the negative lens 11 is excessively increased, which undesirably makes it difficult to manufacture the negative lens element 11. Further, if the value of (Nd1P+Nd1N)/2 exceeds the range of the condition (11), combinations of glass materials satisfying the ranges of the conditions (12) and (13) are limited, which makes it difficult to correct chromatic aberration of magnification. If the value of (Nd1P+Nd1N)/2 exceeds the range of the condition (11), the refractive index of the glass material becomes excessively low, which undesirably increases the uneven thickness ratio. Furthermore, if the value of (Nd1P+Nd1N)/2 exceeds the range of the condition (11), a selection width of the positive lens element 12 for enabling under side correction of the chromatic aberration of magnification is undesirably decreased.

If the value of νd1N exceeds the range of the condition (12), a selection width of the negative lens element 11 for correcting the chromatic aberration of magnification while satisfying the condition (11) is undesirably decreased. If the value of νd1P exceeds the range of the condition (13), over side correction of the chromatic aberration of magnification undesirably becomes difficult and the number of actual materials undesirably becomes small.

In order to correct the aberrations well and miniaturize the entire zoom lens, it is yet further preferable that the zoom lens satisfy at least one of the following conditions (4a)-(13a):

$$1.05 < f2/\sqrt{(fW \cdot fT)} < 1.28 \quad (4a)$$

$$0.88 < |f1/f2| < 1.10 \quad (5a)$$

$$2.1 < f3/f2 < 3.0 \quad (6a)$$

$$-1.05 < (R21a-R21b)/(R21a+R21b) < -0.85 \quad (7a)$$

$$0.13 < (R22a-R23b)/(R22a+R23b) < 0.33 \quad (8a)$$

$$-0.005 < dd/fW < 0.100 \quad (9a)$$

$$1.001 < \beta 3T/\beta 3W < 1.020 \quad (10a)$$

$$1.885 < (Nd1P+Nd1N)/2 < 1.900 \quad (11a)$$

$$38 < \nu d1N < 45 \quad (12a)$$

$$17.5 < \nu d1P < 19.0 \quad (13a).$$

Each embodiment realizes a zoom lens which is suitable for an image-taking optical system, particularly for a retractable image-taking optical system, and has a compact size with a small number of lens elements, a magnification variation ratio of about 3.4 to 4.5 and high optical performance. Further, each embodiment effectively employs the aspheric surfaces in the first and second lens units L1 and L2 to appropriately set the refractive powers of the first and second lens units L1 and L2. This enables effective correction of the various off-axis aberrations such as astigmatism, distortion, and spherical aberration and comatic aberration generated due to the increase of the aperture diameter.

Next, description will be made of an embodiment of a digital camera (image pickup apparatus or optical apparatus) that uses the zoom lens of each of the above-described embodiments with reference to FIG. 13. In FIG. 13, reference numeral 30 denotes a main body of the digital camera, and reference numeral 31 denotes an image-taking optical system constituted by the zoom lens of each of the above-described embodiments. Reference numeral 32 denotes an image pickup element such as a CCD sensor which receives an object image formed by the image-taking optical system 31. Reference numeral 33 denotes a memory which stores image data generated based on output signals from the image pickup element 32. Reference numeral 34 denotes a viewfinder to allow a user to observe the image data displayed on a display element which is constituted by a liquid crystal panel or the like and not shown in the figure. The use of the zoom lens of each of the above-described embodiments for the image pickup apparatus such as the above-described digital camera and a video camera enables realization of a compact image pickup apparatus with high optical performance.

Numerical Examples 1-6 respectively corresponding to Embodiments 1-6 will be shown below. In each of Numerical Examples, i denotes an order of a surface or an optical member counted from the object side, ri denotes a curvature radius of an i-th surface, di denotes a distance between the i-th surface and a (i+1)-th surface, ndi and νdi respectively denote a refractive index and an Abbe constant of a material of an i-th optical member for d-line.

In Numerical Examples 1-6, two surfaces closest to the image plane are planes of a glass member such as a phase plate.

The aspheric surface shape is expressed by the following expression where x represents a displacement amount of an apex of the aspheric surface in the optical axis direction at a position whose height from the optical axis is h, R represents a curvature radius, k represents a conic constant, and A4 to A12 represent aspheric coefficients:

$$x = (h^2/R)/[1+\{1-(1+k)(h/R)^2\}^{1/2}] + A4 \cdot h^4 + A6 \cdot h^6 + A8 \cdot h^8 + A10 \cdot h^{10} + A12 \cdot h^{12}.$$

Moreover, "e-x" means "×10$^{-x}$". The relationships between the above-mentioned conditions and the embodiments are shown in Table 1.

Numerical Example 1

| UNIT mm | | | | | |
|---|---|---|---|---|---|
| SURFACE DATA | | | | | |
| surface no. | r | d | nd | νd | effective diameter |

-continued

UNIT mm

| | | | | | |
|---|---|---|---|---|---|
| 1* | 34077.164 | 1.40 | 1.84954 | 40.1 | 17.90 |
| 2* | 6.147 | 2.37 | | | 13.50 |
| 3 | 11.574 | 2.30 | 1.94595 | 18.0 | 13.60 |
| 4 | 23.631 | (variable) | | | 13.60 |
| 5 (full-open aperture stop) | ∞ | 0.00 | | | 7.87 |
| 6 (variable aperture stop) | ∞ | 0.40 | | | (variable) |
| 7* | 8.527 | 2.70 | 1.67790 | 55.3 | 8.20 |
| 8* | 142.944 | 0.20 | | | 7.90 |
| 9 | 7.193 | 1.90 | 1.51633 | 64.1 | 7.80 |
| 10 | 22.221 | 1.00 | 1.80518 | 25.4 | 7.40 |
| 11 | 4.997 | 2.60 | | | 6.50 |
| 12 | 11.645 | 1.85 | 1.51823 | 58.9 | 6.50 |
| 13 | −35.764 | 0.35 | | | 6.50 |
| 14 (mechanical aperture stop) | ∞ | (variable) | | | 5.60 |
| 15* | 17.304 | 2.00 | 1.58913 | 61.3 | 11.00 |
| 16 | 75.747 | (variable) | | | 11.00 |
| 17 | ∞ | 1.00 | 1.51633 | 64.1 | 15.00 |
| 18 | ∞ | 0.60 | | | 15.00 |
| image plane | ∞ | | | | |

ASPHERIC SURFACE DATA

Surface 1

K = −7.54512e+008  A4 = −1.32965e−004
A6 = 2.62075e−006  A8 = −2.16164e−008
A10 = 5.85538e−011

Surface 2

K = −2.06015e+000  A4 = 5.83062e−004
A6 = −7.90703e−006  A8 = 2.14886e−007
A10 = −2.27615e−009

Surface 7

K = −2.03607e−001  A4 = −7.76290e−005
A6 = −1.74688e−007  A8 = −1.69755e−007
A10 = 2.20100e−009

Surface 8

K = 9.90155e+002  A4 = −1.47130e−005
A6 = −3.47189e−006  A8 = 1.71944e−008
A10 = −8.31011e−009

Surface 15

K = 1.28502e−001  A4 = −7.91998e−006
A6 = −1.79352e−007

ZOOM LENS DATA
Zoom ratio 4.42

| | Wide-angle view | middle | telephoto end |
|---|---|---|---|
| Focal Length | 4.94 | 13.39 | 21.85 |
| F-NUMBER | 2.06 | 3.64 | 5.10 |
| Angle of view | 38.18 | 19.07 | 11.96 |
| Image Height | 3.89 | 4.63 | 4.63 |
| Entire Lens Length | 50.88 | 45.59 | 53.19 |
| BF | 0.60 | 0.60 | 0.60 |
| variable aperture stop 6 | 7.87 | 6.90 | 6.70 |
| d4 | 22.49 | 5.83 | 2.05 |
| d14 | 4.17 | 15.56 | 26.96 |
| d16 | 3.55 | 3.52 | 3.50 |
| d18 | 0.60 | 0.60 | 0.60 |
| entrance pupil position | 8.26 | 5.50 | 4.18 |
| exit pupil position | −26.39 | −77.77 | −910.10 |

-continued

UNIT mm

| | | | |
|---|---|---|---|
| front principal point position | 12.30 | 16.61 | 25.50 |
| rear principal point position | −4.34 | −12.79 | −21.25 |

LENS UNIT DATA

| Lens Unit | Most-Object Side Surface | Focal Length | Lens Unit Length |
|---|---|---|---|
| 1 | 1 | −11.88 | 6.07 |
| 2 | 5 | 13.27 | 11.00 |
| 3 | 15 | 37.59 | 2.00 |
| 4 | 17 | ∞ | 1.00 |

| Lens Unit | Front Principal Point position | Rear Principal Point position |
|---|---|---|
| 1 | 0.03 | −4.31 |
| 2 | 1.02 | −8.39 |
| 3 | −0.37 | −1.61 |
| 4 | 0.33 | −0.33 |

LENS ELEMENT DATA

| Lens Element | Most-Object Side Surface | Focal Length |
|---|---|---|
| 1 | 1 | −7.24 |
| 2 | 3 | 21.95 |
| 3 | 7 | 13.27 |
| 4 | 9 | 19.75 |
| 5 | 10 | −8.22 |
| 6 | 12 | 17.18 |
| 7 | 15 | 37.59 |
| 8 | 17 | 0.00 |

Numerical Example 2

UNIT mm

SURFACE DATA

| surface no. | r | d | nd | vd | effective diameter |
|---|---|---|---|---|---|
| 1* | ∞ | 1.40 | 1.84954 | 40.1 | 15.00 |
| 2* | 6.548 | 2.68 | | | 12.10 |
| 3 | 12.502 | 1.90 | 1.94595 | 18.0 | 12.60 |
| 4 | 25.149 | (variable) | | | 12.20 |
| 5 (full-open aperture stop) | ∞ | 0.00 | | | 8.25 |
| 6 (variable aperture stop) | ∞ | 0.40 | | | (variable) |
| 7* | 7.948 | 2.70 | 1.74330 | 49.3 | 8.70 |
| 8* | 234.393 | 0.20 | | | 8.10 |
| 9 | 6.765 | 1.95 | 1.51633 | 64.1 | 7.40 |
| 10 | 48.513 | 0.60 | 1.80518 | 25.4 | 6.90 |
| 11 | 4.664 | 3.15 | | | 6.10 |
| 12 | 14.433 | 1.65 | 1.71999 | 50.2 | 6.50 |
| 13 | 453.833 | 0.35 | | | 6.50 |
| 14 (mechanical aperture stop) | ∞ | (variable) | | | 5.10 |
| 15 | 15.848 | 2.00 | 1.48749 | 70.2 | 10.80 |
| 16 | −369.084 | (variable) | | | 10.80 |

-continued

UNIT mm

| | | | | | |
|---|---|---|---|---|---|
| 17 | ∞ | 1.00 | 1.51633 | 64.1 | 15.00 |
| 18 | ∞ | 0.60 | | | 15.00 |
| image plane | ∞ | | | | |

ASPHERIC SURFACE DATA

Surface 1

K = −7.54512e+008    A4 = −1.25186e−004
A6 = 2.51878e−006    A8 = −1.50640e−008
A10 = −4.03300e−011

Surface 2

K = −2.25189e+000    A4 = 5.48165e−004
A6 = −8.14113e−006   A8 = 2.62368e−007
A10 = −3.31116e−009

Surface 7

K = −1.06452e−001    A4 = −6.30887e−005
A6 = 7.32454e−007    A8 = 9.99854e−009
A10 = 3.43511e−009

Surface 8

K = 2.33596e+003     A4 = 7.60935e−005
A6 = 8.95825e−007    A8 = 1.71344e−007
A10 = −2.35377e−009

ZOOM LENS DATA
Zoom ratio 3.53

| | Wide-angle view | middle | telephoto end |
|---|---|---|---|
| Focal Length | 6.18 | 14.00 | 21.84 |
| F-NUMBER | 2.06 | 3.66 | 5.05 |
| Angle of view | 33.39 | 18.29 | 11.96 |
| Image Height | 4.07 | 4.63 | 4.63 |
| Entire Lens Length | 45.38 | 43.48 | 50.10 |
| BF | 0.60 | 0.60 | 0.60 |
| variable aperture stop 6 | 8.25 | 6.90 | 6.75 |
| d4 | 17.03 | 5.13 | 1.76 |
| d14 | 4.29 | 14.31 | 24.33 |
| d16 | 3.48 | 3.46 | 3.43 |
| d18 | 0.60 | 0.60 | 0.60 |
| entrance pupil position | 7.81 | 5.37 | 4.12 |
| exit pupil position | −28.70 | −97.98 | 481.03 |
| front principal point position | 12.69 | 17.38 | 26.96 |
| rear principal point position | −5.58 | −13.40 | −21.24 |

LENS UNIT DATA

| Lens Unit | Most-Object Side Surface | Focal Length | Lens Unit Length |
|---|---|---|---|
| 1 | 1 | −12.58 | 5.98 |
| 2 | 5 | 12.97 | 11.00 |
| 3 | 15 | 31.22 | 2.00 |
| 4 | 17 | ∞ | 1.00 |

| Lens Unit | Front Principal Point position | Rear Principal Point position |
|---|---|---|
| 1 | −0.16 | −4.72 |
| 2 | −0.06 | −9.04 |
| 3 | 0.06 | −1.29 |
| 4 | 0.33 | −0.33 |

LENS ELEMENT DATA

| Lens Element | Most-Object Side Surface | Focal Length |
|---|---|---|
| 1 | 1 | −7.71 |
| 2 | 3 | 24.49 |
| 3 | 7 | 11.01 |
| 4 | 9 | 14.99 |
| 5 | 10 | −6.45 |
| 6 | 12 | 20.67 |

-continued

UNIT mm

| | | |
|---|---|---|
| 7 | 15 | 31.22 |
| 8 | 17 | 0.00 |

Numerical Example 3

UNIT mm

SURFACE DATA

| surface no. | r | d | nd | vd | effective diameter |
|---|---|---|---|---|---|
| 1* | −10840.973 | 1.30 | 1.84954 | 40.1 | 15.50 |
| 2* | 6.730 | 2.55 | | | 12.30 |
| 3 | 12.556 | 2.05 | 1.92286 | 18.9 | 12.70 |
| 4 | 28.855 | (variable) | | | 12.40 |
| 5 (full-open aperture stop) | ∞ | 0.00 | | | 8.02 |
| 6 (variable aperture stop) | ∞ | 0.20 | | | (variable) |
| 7* | 7.319 | 2.70 | 1.76414 | 49.0 | 8.40 |
| 8* | 377.634 | 0.20 | | | 7.80 |
| 9 | 8.272 | 1.60 | 1.88300 | 40.8 | 7.10 |
| 10 | −168.841 | 0.40 | 2.00069 | 25.5 | 6.50 |
| 11 | 4.735 | 2.31 | | | 5.50 |
| 12 | 21.643 | 1.60 | 1.88300 | 40.8 | 6.20 |
| 13 | −1384.644 | 0.60 | | | 6.40 |
| 14 (mechanical aperture stop) | ∞ | (variable) | | | 4.90 |
| 15 | 20.294 | 1.80 | 1.60311 | 60.6 | 11.00 |
| 16 | −83.433 | (variable) | | | 11.00 |
| 17 | ∞ | 1.00 | 1.51633 | 64.1 | 15.00 |
| 18 | ∞ | 0.60 | | | 15.00 |
| image plane | ∞ | | | | |

ASPHERIC SURFACE DATA

Surface 1

K = −7.54512e+008    A4 = −3.54380e−005
A6 = 9.12293e−007    A8 = −3.38114e−009
A10 = −3.29861e−011

Surface 2

K = −2.43576e+000    A4 = 6.76380e−004
A6 = −8.69639e−006   A8 = 1.94875e−007
A10 = −1.96480e−009

Surface 7

K = −2.89275e−001    A4 = −1.05883e−004
A6 = −1.41065e−006

Surface 8

K = 2.14084e+003     A4 = 1.23606e−005
A6 = −7.37910e−008

ZOOM LENS DATA
Zoom ratio 3.83

| | Wide-angle view | middle | telephoto end |
|---|---|---|---|
| Focal Length | 6.11 | 14.71 | 23.40 |
| F-NUMBER | 2.06 | 3.71 | 5.35 |
| Angle of view | 33.67 | 17.45 | 11.18 |
| Image Height | 4.07 | 4.63 | 4.63 |
| Entire Lens Length | 45.30 | 41.79 | 48.12 |
| BF | 0.60 | 0.60 | 0.60 |
| variable aperture stop 6 | 8.02 | 6.90 | 6.50 |
| d4 | 18.41 | 5.03 | 1.50 |
| d14 | 4.70 | 14.68 | 24.65 |
| d16 | 3.28 | 3.16 | 3.05 |

-continued

UNIT mm

| | | | |
|---|---|---|---|
| d18 | 0.60 | 0.60 | 0.60 |
| entrance pupil position | 8.29 | 5.39 | 3.99 |
| exit pupil position | −25.14 | −109.19 | 193.63 |
| front principal point position | 12.95 | 18.13 | 30.22 |
| rear principal point position | −5.51 | −14.11 | −22.80 |

LENS UNIT DATA

| Lens Unit | Most-Object Side Surface | Focal Length | Lens Unit Length |
|---|---|---|---|
| 1 | 1 | −13.81 | 5.90 |
| 2 | 5 | 12.70 | 9.61 |
| 3 | 15 | 27.24 | 1.80 |
| 4 | 17 | ∞ | 1.00 |

| Lens Unit | Front Principal Point position | Rear Principal Point position |
|---|---|---|
| 1 | −0.38 | −4.88 |
| 2 | −1.43 | −8.00 |
| 3 | 0.22 | −0.91 |
| 4 | 0.33 | −0.33 |

LENS ELEMENT DATA

| Lens Element | Most-Object Side Surface | Focal Length |
|---|---|---|
| 1 | 1 | −7.92 |
| 2 | 3 | 22.72 |
| 3 | 7 | 9.74 |
| 4 | 9 | 8.97 |
| 5 | 10 | −4.60 |
| 6 | 12 | 24.15 |
| 7 | 15 | 27.24 |
| 8 | 17 | 0.00 |

Numerical Example 4

UNIT mm

SURFACE DATA

| surface no. | r | d | nd | vd | effective diameter |
|---|---|---|---|---|---|
| 1* | 13061.912 | 1.50 | 1.84954 | 40.1 | 15.10 |
| 2* | 6.285 | 2.57 | | | 11.90 |
| 3 | 12.282 | 1.90 | 1.92286 | 18.9 | 12.40 |
| 4 | 28.590 | (variable) | | | 12.10 |
| 5 (full-open aperture stop) | ∞ | 0.00 | | | 8.35 |
| 6 (variable aperture stop) | ∞ | 0.40 | | | (variable) |
| 7* | 7.451 | 2.70 | 1.76414 | 49.0 | 8.80 |
| 8* | 384.175 | 0.15 | | | 8.20 |
| 9 | 7.835 | 2.10 | 1.69680 | 55.5 | 7.40 |
| 10 | −31.213 | 0.50 | 2.00330 | 28.3 | 6.60 |
| 11 | 4.838 | 1.09 | | | 5.90 |
| 12 | 18.613 | 1.60 | 1.74400 | 44.8 | 6.10 |
| 13 | −11.500 | 0.50 | 1.77250 | 49.6 | 6.30 |
| 14 | 22.093 | 0.50 | | | 6.50 |
| 15 | 15.705 | 1.25 | 1.77250 | 49.6 | 6.50 |
| 16 | −69.049 | 0.00 | | | 6.50 |
| 17 (mechanical aperture stop) | ∞ | (variable) | | | 4.90 |
| 18* | 21.713 | 2.00 | 1.58313 | 59.4 | 12.00 |
| 19* | −124.152 | (variable) | | | 12.00 |
| 20 | ∞ | 1.00 | 1.51633 | 64.1 | 15.00 |
| 21 | ∞ | 0.60 | | | 15.00 |
| image plane | ∞ | | | | |

ASPHERIC SURFACE DATA

Surface 1

K = −7.54512e+008    A4 = −7.92076e−005
A6 = 1.37788e−006    A8 = −8.34300e−009
A10 = 6.51295e−012

Surface 2

K = −2.23444e+000    A4 = 6.60364e−004
A6 = −8.78286e−006   A8 = 1.77727e−007
A10 = −1.55880e−009

Surface 7

K = −3.10882e−001    A4 = −4.88442e−005
A6 = 1.70793e−007    A8 = −2.24340e−008
A10 = 7.27768e−010

Surface 8

K = 7.21768e+003     A4 = −1.37404e−005
A6 = 5.61129e−007    A8 = 1.03849e−008
A10 = −3.42753e−009

Surface 18

K = 1.82166e−001     A4 = 2.63870e−005
A6 = −2.21570e−007   A8 = −5.92530e−009

Surface 19

K = −1.41474e+002    A4 = 2.19192e−005
A6 = 5.56289e−007    A8 = −1.94427e−008

ZOOM LENS DATA
Zoom ratio 3.43

| | Wide-angle view | middle | telephoto end |
|---|---|---|---|
| Focal Length | 6.12 | 13.49 | 21.00 |
| F-NUMBER | 2.06 | 3.67 | 5.06 |
| Angle of view | 34.08 | 19.02 | 12.49 |
| Image Height | 4.14 | 4.65 | 4.65 |
| Entire Lens Length | 46.42 | 43.52 | 49.07 |
| BF | 0.60 | 0.60 | 0.60 |
| variable aperture stop 6 | 8.35 | 6.90 | 6.70 |
| d4 | 17.93 | 6.04 | 2.59 |
| d17 | 4.73 | 13.72 | 23.03 |
| d19 | 3.40 | 3.41 | 3.09 |
| d21 | 0.60 | 0.60 | 0.60 |
| entrance pupil position | 7.91 | 5.61 | 4.43 |
| exit pupil position | −25.04 | −68.82 | −749.72 |
| front principal point position | 12.57 | 16.48 | 24.85 |
| rear principal point position | −5.52 | −12.89 | −20.40 |

LENS UNIT DATA

| Lens Unit | Most-Object Side Surface | Focal Length | Lens Unit Length |
|---|---|---|---|
| 1 | 1 | −12.75 | 5.97 |
| 2 | 5 | 12.74 | 10.79 |
| 3 | 18 | 31.85 | 2.00 |
| 4 | 20 | ∞ | 1.00 |

| Lens Unit | Front Principal Point position | Rear Principal Point position |
|---|---|---|
| 1 | −0.26 | −4.85 |
| 2 | −1.03 | −8.28 |

| | | |
|---|---|---|
| 3 | 0.19 | −1.08 |
| 4 | 0.33 | −0.33 |

LENS ELEMENT DATA

| Lens Element | Most-Object Side Surface | Focal Length |
|---|---|---|
| 1 | 1 | −7.40 |
| 2 | 3 | 22.10 |
| 3 | 7 | 9.91 |
| 4 | 9 | 9.19 |
| 5 | 10 | −4.15 |
| 6 | 12 | 9.78 |
| 7 | 13 | −9.73 |
| 8 | 15 | 16.67 |
| 9 | 18 | 31.85 |
| 10 | 20 | 0.00 |

Numerical Example 5

UNIT mm

SURFACE DATA

| surface no. | r | d | nd | νd | effective diameter |
|---|---|---|---|---|---|
| 1* | −89214.415 | 1.50 | 1.84954 | 40.1 | 14.10 |
| 2* | 6.276 | 2.90 | | | 11.20 |
| 3 | 12.150 | 1.80 | 1.94595 | 18.0 | 11.60 |
| 4 | 22.683 | (variable) | | | 11.20 |
| 5 (full-open aperture stop) | ∞ | 0.00 | | | 8.20 |
| 6 (variable aperture stop) | ∞ | 0.40 | | | (variable) |
| 7* | 8.872 | 2.50 | 1.84954 | 40.1 | 8.60 |
| 8* | −2370.177 | 0.15 | | | 8.10 |
| 9 | 6.886 | 1.90 | 1.77250 | 49.6 | 7.40 |
| 10 | −85.722 | 0.50 | 2.00069 | 25.5 | 7.00 |
| 11 | 5.260 | 1.00 | | | 6.10 |
| 12 | 22.227 | 1.50 | 1.62299 | 58.2 | 6.20 |
| 13 | −10.000 | 0.50 | 1.65844 | 50.9 | 6.20 |
| 14 | 7.424 | 1.01 | | | 6.30 |
| 15 | 7.771 | 1.82 | 1.58313 | 59.4 | 6.50 |
| 16* | −59.848 | 0.20 | | | 6.50 |
| 17 (mechanical aperture stop) | ∞ | (variable) | | | 4.80 |
| 18 | 17.340 | 1.80 | 1.60311 | 60.6 | 11.00 |
| 19 | 400.000 | (variable) | | | 11.00 |
| 20 | ∞ | 1.00 | 1.51633 | 64.1 | 15.00 |
| 21 | ∞ | 0.60 | | | 15.00 |
| image plane | ∞ | | | | |

ASPHERIC SURFACE DATA

Surface 1

K = −7.54512e+008  A4 = −5.27895e−005
A6 = 1.81338e−006  A8 = −1.88246e−008
A10 = −6.84842e−012

Surface 2

K = −2.29361e+000  A4 = 7.28531e−004
A6 = −8.38169e−006  A8 = 2.59226e−007
A10 = −4.31878e−009

Surface 7

K = −3.37129e−001  A4 = −2.42071e−005
A6 = 2.11081e−006  A8 = −6.54870e−008
A10 = 2.35287e−009

Surface 8

K = 2.52686e+005  A4 = 2.28810e−005
A6 = 3.61428e−006  A8 = −1.31477e−007
A10 = 3.73915e−009

Surface 16

K = −2.22899e+002  A4 = 2.65127e−004
A6 = 7.29414e−006  A8 = 8.89745e−007

ZOOM LENS DATA
Zoom ratio 3.40

| | Wide-angle view | middle | telephoto end |
|---|---|---|---|
| Focal Length | 6.17 | 13.58 | 21.00 |
| F-NUMBER | 2.06 | 3.68 | 5.23 |
| Angle of view | 33.72 | 18.82 | 12.43 |
| Image Height | 4.12 | 4.63 | 4.63 |
| Entire Lens Length | 43.49 | 43.09 | 49.78 |
| BF | 0.60 | 0.60 | 0.60 |
| variable aperture stop 6 | 8.20 | 6.90 | 6.50 |
| d4 | 15.03 | 4.97 | 2.00 |
| d17 | 3.95 | 13.64 | 23.32 |
| d19 | 3.43 | 3.40 | 3.38 |
| d21 | 0.60 | 0.60 | 0.60 |
| entrance pupil position | 7.27 | 5.26 | 4.25 |
| exit pupil position | −25.81 | −86.09 | 599.58 |
| front principal point position | 12.00 | 16.71 | 25.99 |
| rear principal point position | −5.57 | −12.98 | −20.40 |

LENS UNIT DATA

| Lens Unit | Most-Object Side Surface | Focal Length | Lens Unit Length |
|---|---|---|---|
| 1 | 1 | −11.62 | 6.20 |
| 2 | 5 | 12.20 | 11.48 |
| 3 | 18 | 30.00 | 1.80 |
| 4 | 20 | ∞ | 1.00 |

| Lens Unit | Front Principal Point position | Rear Principal Point position |
|---|---|---|
| 1 | −0.06 | −4.85 |
| 2 | −0.83 | −9.07 |
| 3 | −0.05 | −1.17 |
| 4 | 0.33 | −0.33 |

LENS ELEMENT DATA

| Lens Element | Most-Object Side Surface | Focal Length |
|---|---|---|
| 1 | 1 | −7.39 |
| 2 | 3 | 25.54 |
| 3 | 7 | 10.41 |
| 4 | 9 | 8.33 |
| 5 | 10 | −4.94 |
| 6 | 12 | 11.27 |
| 7 | 13 | −6.40 |
| 8 | 15 | 11.91 |
| 9 | 18 | 30.00 |
| 10 | 20 | 0.00 |

Numerical Example 6

UNIT mm

SURFACE DATA

| surface no. | r | d | nd | vd | effective diameter |
|---|---|---|---|---|---|
| 1* | −22050.281 | 1.40 | 1.84954 | 40.1 | 14.90 |
| 2* | 6.673 | 2.70 | | | 12.10 |
| 3 | 12.573 | 1.90 | 1.94595 | 18.0 | 12.60 |
| 4 | 24.746 | (variable) | | | 12.20 |
| 5 (full-open aperture stop) | ∞ | 0.00 | | | 8.13 |
| 6 (variable aperture stop) | ∞ | 0.40 | | | (variable) |
| 7* | 7.629 | 3.00 | 1.76753 | 49.3 | 8.60 |
| 8* | 274.291 | 0.33 | | | 7.90 |
| 9 | 8.757 | 1.55 | 1.83481 | 42.7 | 7.30 |
| 10 | 62.610 | 0.85 | 2.00069 | 25.5 | 6.80 |
| 11 | 4.514 | 1.25 | | | 5.90 |
| 12 | 22.886 | 3.10 | 1.76753 | 49.3 | 6.50 |
| 13* | −22.652 | 0.20 | | | 6.50 |
| 14 (mechanical aperture stop) | ∞ | (variable) | | | 5.08 |
| 15 | 20.375 | 1.90 | 1.60311 | 60.6 | 11.00 |
| 16 | −227.361 | (variable) | | | 11.00 |
| 17 | ∞ | 1.00 | 1.51633 | 64.1 | 15.00 |
| 18 | ∞ | 0.60 | | | 15.00 |
| image plane | ∞ | | | | |

ASPHERIC SURFACE DATA

Surface 1

$K = -7.54512e+008$  $A4 = -1.41638e-004$
$A6 = 2.43499e-006$  $A8 = -1.08799e-008$
$A10 = -8.08848e-011$

Surface 2

$K = -2.37809e+000$  $A4 = 5.52232e-004$
$A6 = -9.41771e-006$  $A8 = 2.91509e-007$
$A10 = -3.62121e-009$

Surface 7

$K = -2.68719e-001$  $A4 = -9.96850e-005$
$A6 = -2.28406e-007$  $A8 = -1.65409e-008$
$A10 = -4.67934e-010$

Surface 8

$K = 3.55301e+003$  $A4 = 6.20168e-005$
$A6 = -1.41413e-007$  $A8 = 3.03537e-008$
$A10 = -5.26369e-009$

Surface 13

$K = -2.97220e+000$  $A4 = -3.95134e-004$
$A6 = -5.34539e-006$  $A8 = -8.27917e-007$

ZOOM LENS DATA
Zoom ratio 3.53

| | Wide-angle view | middle | telephoto end |
|---|---|---|---|
| Focal Length | 6.18 | 14.00 | 21.84 |
| F-NUMBER | 2.06 | 3.62 | 5.05 |
| Angle of view | 33.39 | 18.29 | 11.96 |
| Image Height | 4.07 | 4.63 | 4.63 |
| Entire Lens Length | 45.56 | 43.32 | 49.53 |
| BF | 0.60 | 0.60 | 0.60 |
| variable aperture stop 6 | 8.13 | 6.90 | 6.65 |
| d4 | 16.80 | 5.02 | 1.68 |
| d14 | 5.09 | 14.66 | 24.23 |
| d16 | 3.48 | 3.46 | 3.43 |
| d18 | 0.60 | 0.60 | 0.60 |
| entrance pupil position | 7.86 | 5.37 | 4.12 |
| exit pupil position | −26.08 | −81.01 | 1870.88 |
| front principal point position | 12.61 | 16.98 | 26.21 |
| rear principal point position | −5.58 | −13.40 | −21.24 |

LENS UNIT DATA

| Lens Unit | Most-Object Side Surface | Focal Length | Lens Unit Length |
|---|---|---|---|
| 1 | 1 | −12.72 | 6.00 |
| 2 | 5 | 12.61 | 10.68 |
| 3 | 15 | 31.09 | 1.90 |
| 4 | 17 | ∞ | 1.00 |

| Lens Unit | Front Principal Point position | Rear Principal Point position |
|---|---|---|
| 1 | −0.14 | −4.70 |
| 2 | −0.52 | −7.78 |
| 3 | 0.10 | −1.09 |
| 4 | 0.33 | −0.33 |

LENS ELEMENT DATA

| Lens Element | Most-Object Side Surface | Focal Length |
|---|---|---|
| 1 | 1 | −7.85 |
| 2 | 3 | 25.11 |
| 3 | 7 | 10.17 |
| 4 | 9 | 12.04 |
| 5 | 10 | −4.90 |
| 6 | 12 | 15.28 |
| 7 | 15 | 31.09 |
| 8 | 17 | 0.00 |

TABLE 1

| | condition (1) | | preferabele condition | | Numerical Example | | | | | |
|---|---|---|---|---|---|---|---|---|---|---|
| | lower limit | upper limit | lower limit | upper limit | 1 | 2 | 3 | 4 | 5 | 6 |
| condition 1 | 0.40 | 0.70 | 0.42 | 0.55 | 0.434 | 0.468 | 0.444 | 0.476 | 0.536 | 0.431 |
| D2 | | | | | 10.254 | 10.250 | 8.813 | 10.391 | 10.879 | 10.082 |
| d2a | | | | | 4.454 | 4.800 | 3.913 | 4.941 | 5.829 | 4.350 |
| condition 2 | 0.50 | 1.30 | 0.70 | 1.05 | 1.000 | 0.848 | 0.767 | 0.778 | 0.853 | 0.807 |
| f21 | | | | | 13.268 | 11.012 | 9.736 | 9.913 | 10.409 | 10.174 |
| f2 | | | | | 13.268 | 12.971 | 12.702 | 12.741 | 12.200 | 12.614 |
| condition 3 | 3.20 | 5.00 | 3.30 | 4.50 | 4.404 | 3.520 | 3.751 | 3.352 | 3.388 | 3.521 |
| β2W | | | | | −0.502 | −0.608 | −0.553 | −0.586 | −0.660 | −0.598 |
| β3W | | | | | 0.829 | 0.807 | 0.800 | 0.820 | 0.805 | 0.812 |
| β2T | | | | | −2.215 | −2.147 | −2.096 | −1.986 | −2.242 | −2.109 |
| β3T | | | | | 0.831 | 0.808 | 0.809 | 0.830 | 0.806 | 0.814 |
| condition 4 | 1.00 | 1.30 | 1.05 | 1.28 | 1.277 | 1.116 | 1.062 | 1.124 | 1.071 | 1.086 |
| f2 | | | | | 13.268 | 12.971 | 12.702 | 12.741 | 12.200 | 12.614 |
| fW | | | | | 4.845 | 6.180 | 6.110 | 6.119 | 6.173 | 6.180 |
| fT | | | | | 21.847 | 21.844 | 23.401 | 21.000 | 21.000 | 21.844 |
| condition 5 | 0.70 | 1.15 | 0.88 | 1.10 | 0.895 | 0.970 | 1.087 | 1.000 | 0.952 | 1.009 |
| f1 | | | | | −11.876 | −12.584 | −13.811 | −12.746 | −11.619 | −12.723 |
| f2 | | | | | 13.268 | 12.971 | 12.702 | 12.741 | 12.200 | 12.614 |
| condition 6 | 2.00 | 3.10 | 2.10 | 3.00 | 2.833 | 2.407 | 2.145 | 2.500 | 2.459 | 2.465 |
| f3 | | | | | 37.593 | 31.224 | 27.243 | 31.854 | 30.000 | 31.094 |
| f2 | | | | | 13.268 | 12.971 | 12.702 | 12.741 | 12.200 | 12.614 |
| condition 7 | −1.10 | −0.70 | −1.05 | −0.85 | −0.887 | −0.934 | −0.962 | −0.962 | −1.008 | −0.946 |
| R21a | | | | | 8.527 | 7.948 | 7.319 | 7.451 | 8.872 | 7.629 |
| R21b | | | | | 142.944 | 234.393 | 377.634 | 384.175 | −2370.177 | 274.291 |
| condition 8 | 0.12 | 0.35 | 0.13 | 0.33 | 0.180 | 0.184 | 0.272 | 0.236 | 0.134 | 0.320 |
| R22a | | | | | 7.193 | 6.765 | 8.272 | 7.835 | 6.886 | 8.757 |
| R23b | | | | | 4.997 | 4.664 | 4.735 | 4.838 | 5.260 | 4.514 |
| condition 9 | −0.010 | 0.120 | 0.005 | 0.100 | 0.071 | 0.057 | 0.098 | 0.000 | 0.032 | 0.032 |
| dd (mechanical aperture stop) | | | | | 0.350 | 0.350 | 0.600 | 0.000 | 0.200 | 0.200 |
| fW | | | | | 4.945 | 6.180 | 6.110 | 6.119 | 6.173 | 6.180 |
| condition 10 | 1.000 | 1.050 | 1.001 | 1.020 | 1.002 | 1.002 | 1.010 | 1.012 | 1.002 | 1.002 |
| β3W | | | | | 0.829 | 0.807 | 0.800 | 0.820 | 0.805 | 0.812 |
| β3T | | | | | 0.831 | 0.808 | 0.809 | 0.830 | 0.806 | 0.814 |
| condition 11 | 1.88 | 2.00 | 1.885 | 1.900 | 1.898 | 1.898 | 1.886 | 1.886 | 1.898 | 1.898 |
| Nd1N | | | | | 1.850 | 1.850 | 1.850 | 1.850 | 1.850 | 1.850 |
| Nd1p | | | | | 1.946 | 1.946 | 1.923 | 1.923 | 1.946 | 1.946 |
| condition 12 vd1N | 35 | 60 | 38 | 45 | 40.1 | 40.1 | 40.1 | 40.1 | 40.1 | 40.1 |
| condition 13 vd1p | 16 | 20 | 17.5 | 19 | 18.0 | 18.0 | 18.9 | 18.9 | 18.0 | 18.0 |

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2009-089941, filed on Apr. 2, 2009, which is hereby incorporated by reference herein in its entirety.

What is claimed is:

1. A zoom lens comprising in order from an object side to an image side:

a first lens unit having a negative refractive power;

a second lens unit having a positive refractive power; and a third lens unit having a positive refractive power, wherein distances between the first to third lens units in a direction of an optical axis are varied during zooming, wherein the second lens unit includes a lens element whose image side surface has a concave shape, a most object side positive lens element and a most image side positive lens element, and wherein the following conditions are satisfied:

$$0.4 < d2a/D2 < 0.7$$

$$0.5 < f21/f2 < 1.3$$

$$3.2 < (\beta2T \cdot \beta3W)/(\beta2W \cdot \beta3T) < 5.0$$

where D2 represents a thickness of the second lens unit on the optical axis, d2a represents a distance on the optical axis from a surface Rc whose curvature is strongest among those of image side surfaces having concave shapes in the second lens unit to an image side surface of the most image side positive lens element in the second lens unit, f2 represents a focal length of the second lens unit, f21 represents a focal length of the most object side positive lens element in the second lens unit, β2T and β3T respectively represent image-forming magnifications of the second and third lens units at a telephoto end, and β2W and β3W respectively represent image-forming magnifications of the second and third lens units at a wide-angle end.

2. A zoom lens according to claim 1, wherein, during zooming from the wide-angle end to the telephoto end, the first lens unit is moved along a locus convex toward the image side, the second lens unit is moved monotonically to the object side, and the third lens unit is moved monotonically to the image side.

3. A zoom lens according to claim 1, wherein the second lens unit includes, in order from the object side to the image side, the most object side positive lens element, a positive lens element, a negative lens element and the most image side positive lens element.

4. A zoom lens according to claim 1, wherein the second lens unit includes, in order from the object side to the image side, the most object side positive lens element whose object side surface has a convex shape, a positive lens element whose object side surface has a convex shape, a negative lens element whose image side surface has a concave shape and the most image side positive lens element.

5. A zoom lens according to claim 1, wherein an object side surface and an image side surface of the most object side positive lens element in the second lens unit have aspheric shapes.

6. A zoom lens according to claim 1, wherein the following condition is satisfied:

$1.0 < f2/\sqrt{(fW \cdot fT)} < 1.3$ where fW and fT respectively represent focal lengths of the entire zoom lens at the wide-angle end and the telephoto end.

7. A zoom lens according to claim 1, wherein the following condition is satisfied:

$0.7 < |f1/f2| < 1.15$ where f1 represents a focal length of the first lens unit.

8. A zoom lens according to claim 1, wherein the following condition is satisfied:

$2.0 < f3/f2 < 3.1$ where f3 represents a focal length of the third lens unit.

9. A zoom lens according to claim 1, wherein the following condition is satisfied:

$-1.1 < (R21a - R21b)/(R21a + R21b) < -0.7$ where R21a and R21b respectively represent curvature radii of object side and image side surfaces of the most object side positive lens element in the second lens unit.

10. A zoom lens according to claim 1, wherein the second lens unit includes, in order from the object side to the image side, the most object side positive lens element whose object side surface has a convex shape, a second object side positive lens element whose object side surface has a convex shape, a negative lens element whose image side surface has a concave shape and the most image side positive lens element, and
wherein the following condition is satisfied:

$0.12 < (R22a - R23b)/(R22a + R23b) < 0.35$ where R22a represents a curvature radius of the object side surface of the second object side positive lens element, and R23b represents a curvature radius of the image side surface of the negative lens element.

11. A zoom lens according to claim 1, wherein a mechanical aperture stop having a fixed aperture diameter is disposed on the image side further than an image side surface of the most image side positive lens element in the second lens unit.

12. A zoom lens according to claim 1, wherein a mechanical aperture stop having a fixed aperture diameter is disposed on the image side further than an image side surface of the most image side positive lens element in the second lens unit, and
wherein the following condition is satisfied:

$-0.01 < dd/fW < 0.12$ where fW represents a focal length of the entire zoom lens at the wide-angle end, and dd represents a distance on the optical axis from a most image side surface of the second lens unit to the mechanical aperture stop.

13. A zoom lens according to claim 1, wherein the following condition is satisfied:

$1.00 < \beta 3T/\beta 3W < 1.05$.

14. A zoom lens according to claim 1, wherein the first lens unit includes, in order from the object side to the image side, a negative lens element and a positive lens element.

15. A zoom lens according to claim 1, wherein the first lens unit includes, in order from the object side to the image side, a negative lens element and a positive lens element, and
wherein the following conditions are satisfied:

$1.88 < (Nd1P + Nd1N)/2 < 2.00$ $35 < vd1N < 60$ $16 < vd1P < 20$ where Nd1N and vd1N respectively represent a refractive index and an Abbe constant of a material of the negative lens element in the first lens unit, and Nd1P and vd1P respectively represent a refractive index and an Abbe constant of a material of the positive lens element in the first lens unit.

16. A zoom lens according to claim 1, wherein the third lens unit is moved to the object side when focusing is performed from an infinitely distant object to a near object.

17. An image pickup apparatus comprising:
a zoom lens according to claim 1, and
an image pickup element configured to photoelectrically convert an optical image formed by the zoom lens.

* * * * *